(12) United States Patent
Seki et al.

(10) Patent No.: US 9,706,615 B2
(45) Date of Patent: Jul. 11, 2017

(54) LIGHTING DEVICE AND ILLUMINATION APPARATUS

(71) Applicant: Panasonic Intellectual Property Management Co., Ltd., Osaka (JP)

(72) Inventors: Keisuke Seki, Osaka (JP); Takeshi Kamoi, Kyoto (JP); Daisuke Yamahara, Osaka (JP); Shun Kusuda, Osaka (JP)

(73) Assignee: PANASONIC INTETTECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/134,759

(22) Filed: Apr. 21, 2016

(65) Prior Publication Data

US 2016/0323947 A1 Nov. 3, 2016

(30) Foreign Application Priority Data

Apr. 28, 2015 (JP) ................................. 2015-092339
Apr. 28, 2015 (JP) ................................. 2015-092346

(51) Int. Cl.
*H05B 37/00* (2006.01)
*H05B 33/08* (2006.01)
*H02M 3/156* (2006.01)
*H02M 3/155* (2006.01)
*H02M 1/00* (2006.01)
(Continued)

(52) U.S. Cl.
CPC ........ *H05B 33/0815* (2013.01); *H02M 3/156* (2013.01); *H05B 33/0851* (2013.01); *H02M 1/32* (2013.01); *H02M 1/4208* (2013.01); *H02M 2001/0009* (2013.01); *H02M 2003/1557* (2013.01)

(58) Field of Classification Search
CPC ............ H05B 33/0815; H05B 33/0851; H05B 33/0896; H02M 1/08; H02M 3/156; H02M 2001/0009; H02M 2003/1557
USPC ................. 315/200 R, 258, 302, 307, 209 R
See application file for complete search history.

(56) References Cited

U.S. PATENT DOCUMENTS 7,102,339 B1 * 9/2006 Ferguson .............. H02M 3/157
323/282
8,193,725 B2 * 6/2012 Chen .................. H05B 33/0815
315/185 S

FOREIGN PATENT DOCUMENTS

JP 2007-189004 A 7/2007
JP 2012-050160 A 3/2012

* cited by examiner

*Primary Examiner* — Daniel D Chang
(74) *Attorney, Agent, or Firm* — Renner, Otto, Boisselle & Sklar, LLP.

(57) ABSTRACT

A lighting device which outputs a current to a solid-state light emitting element includes: a direct current-to-direct current (DC-to-DC) converter; and an output detector which detects an output from the DC-to-DC converter, wherein the DC-to-DC converter includes: a switching element; a control device which controls the switching element in order to generate the output; and a current detector which detects a current which flows through the switching element, and if a current value of the current detected by the current detector is less than a predetermined threshold, the control device controls the switching element according to a duty cycle determined based on an output value of the output detected by the output detector, and if the current value is greater than the predetermined threshold, the control device controls the switching element according to a duty cycle lower than the duty cycle determined based on the output value.

8 Claims, 28 Drawing Sheets

(51) Int. Cl.
*H02M 1/32* (2007.01)
*H02M 1/42* (2007.01)

LIGHTING DEVICE AND ILLUMINATION APPARATUS

CROSS REFERENCE TO RELATED APPLICATIONS

This application claims the benefit of priority of Japanese Patent Application Number 2015-092339 filed on Apr. 28, 2015 and Japanese Patent Application Number 2015-092346 filed on Apr. 28, 2015, the entire contents of which are hereby incorporated by reference.

BACKGROUND

1. Technical Field

The present disclosure relates to a lighting device and an illumination apparatus, and in particular to a lighting device which outputs a current to a solid-state light emitting element and an illumination apparatus which includes the lighting device.

2. Description of the Related Art

Various lighting devices have been proposed as lighting devices which supply a current to solid-state light emitting elements such as light emitting diodes (LEDs) (for example, see Japanese Unexamined Patent Application Publication No. 2007-189004 (Patent Literature 1)).

Patent Literature 1 discloses a lighting device which includes a direct current-to-direct current (DC-to-DC) converter which is a single ended primary inductance converter (SEPIC). A SEPIC DC-to-DC converter performs buckboost (step-up and step-down) operation. Furthermore, according to a SEPIC DC-to-DC converter, an inductor is connected to a commercial alternating current (AC) power supply, and a current flows by switching of a switching element during the entire cycle of the commercial AC power supply, thus improving a power-factor of an input current.

SUMMARY

Switching control of a switching element included in a DC-to-DC converter yields an advantage of simplifying a control circuit, by turning on the switching element for each fixed period.

However, a lighting device disclosed in Patent Literature 1 mentioned above has a problem that a sudden change in power supply voltage of a commercial AC power supply results in unstable operation if a switching element is turned on for each fixed period. In other words, if a power supply voltage of commercial AC power suddenly changes, LC resonance occurs due to an inductor and a capacitor included in a DC-to-DC converter, and current oscillations occur. This gradually increases a current flowing through the switching element, and damages the switching element.

The present disclosure has been conceived in order to solve such a problem, and provides a lighting device which includes a DC-to-DC converter and prevents an excessive current from flowing through a switching element included in the DC-to-DC converter even if a voltage input to the DC-to-DC converter suddenly changes, and an illumination apparatus which includes the lighting device.

Furthermore, the present disclosure provides a lighting device which includes a DC-to-DC converter which turns on a switching element for each fixed period, and stably operates even if an input power supply voltage of the AC power supply suddenly changes, and an illumination apparatus.

In order to solve the above problem, a lighting device according to an aspect of the present disclosure is a lighting device which outputs a current to a solid-state light emitting element, the lighting device including: a direct current-to-direct current (DC-to-DC) converter; and an output detector which detects an output from the DC-to-DC converter. The DC-to-DC converter includes: a switching element; a control device which turns on and off the switching element in order to generate the output; and a current detector which detects a current which flows through the switching element. If a current value of the current detected by the current detector is less than a predetermined threshold, the control device controls the switching element according to a duty cycle determined based on an output value of the output detected by the output detector. If the current value is greater than the predetermined threshold, the control device controls the switching element according to a duty cycle lower than the duty cycle determined based on the output value.

Furthermore, a lighting device according to an aspect of the present disclosure is a lighting device which is connected to an alternating current (AC) power supply, and supplies a current to a solid-state light emitting element, the lighting device including: a rectifier circuit which rectifies AC power from the AC power supply; a direct current-to-direct current (DC-to-DC) converter which includes a switching element and a rectifier element, chops a direct current from the rectifier circuit by repetition of on and off of the switching element, and rectifies, with the rectifier element, a current obtained by chopping the direct current; a periodic signal generator circuit which generates a periodic signal indicating arrival of a fixed period; a zero crossing detector circuit which detects that a current which flows through the rectifier element has reached zero in an off period of the switching element; an on signal generator circuit which generates an on signal indicating a time to turn on the switching element if the zero crossing detector circuit has detected that the current has reached zero at a moment when the periodic signal indicates the arrival in the off period of the switching element; and a drive circuit which turns on the switching element in accordance with the time indicated by the on signal generated by the on signal generator circuit, wherein if the zero crossing detector circuit has not detected that the current has reached zero at the moment when the periodic signal indicates the arrival in the off period of the switching element, the on signal generator circuit waits at least until the zero crossing detector circuit detects that the current has reached zero, and generates the on signal.

Furthermore, an illumination apparatus according to an aspect of the present disclosure includes the lighting device, and a solid-state light emitting element which receives supply of a current from the lighting device.

The present disclosure provides a lighting device which includes a DC-to-DC converter and prevents an excessive current from flowing through a switching element included in the DC-to-DC converter even if a voltage input to the DC-to-DC converter suddenly changes, and an illumination apparatus which includes the lighting device.

The present disclosure provides a lighting device which includes a DC-to-DC converter which turns on a switching element for each fixed period, and stably operates even if an input power supply voltage of the AC power supply suddenly changes, and an illumination apparatus.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes embodiments of the present disclosure, with reference to the drawings. Each of the embodiments described below shows a particular example. The numerical values, shapes, materials, elements, the arrangement and connection of the elements, and others indicated in the following embodiments are mere examples, and thus are not intended to limit the present disclosure. Therefore, among the elements in the following embodiments, elements not recited in any of the independent claims defining the most generic part of the present disclosure are described as arbitrary elements.

Note that the drawings are schematic diagrams, and do not necessarily provide strictly accurate illustration. In addition, the same numerals are given to substantially the same configurations throughout the drawings, and an overlapping description is omitted or simplified.

Embodiment 1

1-1. Configuration

Described first is a configuration of a lighting device according to Embodiment 1, with reference to the drawings.

Figure 1:
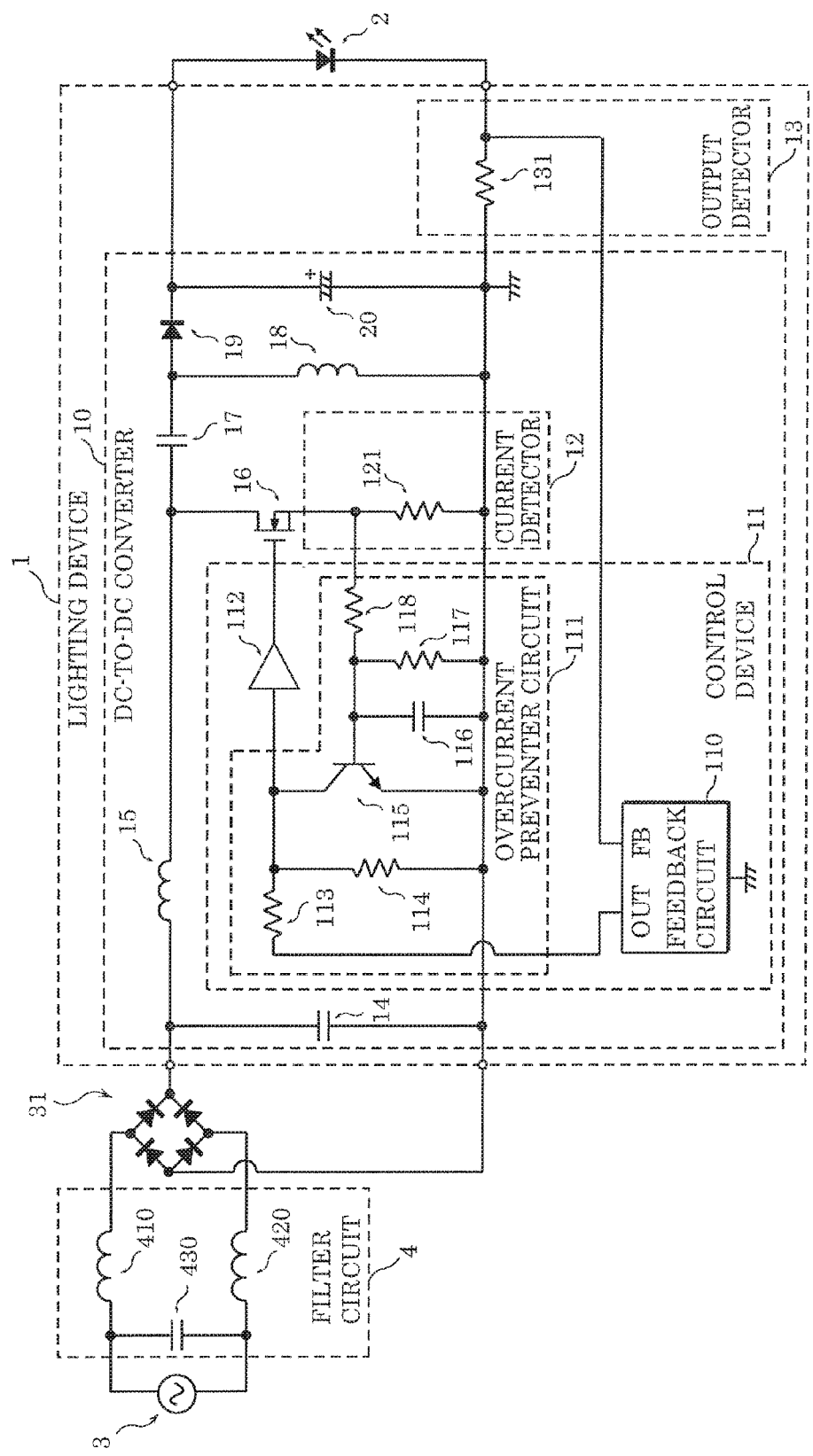
FIG. 1 is a circuit diagram illustrating a configuration of a lighting device according to Embodiment 1.

FIG. 1 is a circuit diagram illustrating a configuration of lighting device 1 according to the present embodiment. Note that FIG. 1 illustrates AC power supply 3, filter circuit 4, diode bridge 31, and light emitting diode (LED) 2, together with lighting device 1.

AC power supply 3 outputs an alternating voltage. AC power supply 3 is not particularly limited as long as the power supply outputs an alternating voltage. AC power supply 3 is a system power supply such as a commercial power supply, for example.

Filter circuit 4 is a filter for inhibiting high frequency noise generated by lighting device 1 through switching operation from leaking out to AC power supply 3. In the present embodiment, filter circuit 4 includes capacitor 430 connected between output terminals of AC power supply 3, and inductors 410 and 420 connected to the output terminals of AC power supply 3.

Diode bridge 31 is a circuit which converts an input alternating voltage into a direct voltage, and outputs the direct voltage. In the present embodiment, diode bridge 31 converts, into a direct voltage, an alternating voltage input from AC power supply 3 via filter circuit 4, and outputs the direct voltage to lighting device 1. In the present embodiment, although diode bridge 31 includes a diode bridge, diode bridge 31 is not particularly limited as long as the diode bridge is a circuit which converts an alternating voltage into a direct voltage.

Lighting device 1 outputs a current to a solid-state light emitting element. In the present embodiment, LED 2 is used as a solid-state light emitting element. As illustrated in FIG. 1, lighting device 1 includes DC-to-DC converter 10 and output detector 13. The following describes elements of lighting device 1.

Output detector 13 detects an output from DC-to-DC converter 10. In the present embodiment, output detector 13 includes resistor 131 and detects an output current from DC-to-DC converter 10. Output detector 13 inputs, to control device 11 of DC-to-DC converter 10, a voltage applied to resistor 131. An output current from DC-to-DC converter 10 flows through resistor 131, and thus a voltage applied to resistor 131 can be used as a signal corresponding to an output value from (i.e., a current value output from) DC-to-DC converter 10. Accordingly, resistor 131 is used as a sense resistor for detecting an output current from DC-to-DC converter 10.

DC-to-DC converter 10 is a circuit which converts a direct voltage input from diode bridge 31, and outputs the resultant voltage. DC-to-DC converter 10 includes switching element 16, control device 11, and current detector 12. In the present embodiment, DC-to-DC converter 10 further includes capacitors 14 and 17, inductors 15 and 18, diode 19, and electrolytic capacitor 20. DC-to-DC converter 10 is a SEPIC converter which is one type of a buck-boost converter that increases or decreases an input voltage, based on the characteristics of LED 2 which is a load of lighting device 1. Capacitor 14 is connected between two output terminals of diode bridge 31. Inductor 15 has one terminal connected to a high-potential output terminal of diode bridge 31, and another terminal connected to the drain electrode of switching element 16. Capacitor 17 has one terminal connected to the drain electrode of switching element 16, and another terminal connected to one terminal of inductor 18. Inductor 18 has the one terminal connected to the other terminal of capacitor 17, and another grounded terminal. Diode 19 has an anode electrode connected to the one terminal of inductor 18, and a cathode electrode connected to a high-potential output terminal of lighting device 1. Electrolytic capacitor 20 has a positive electrode connected to the high-potential output terminal of lighting device 1, and a grounded negative electrode.

Switching element 16 switches (i.e., repeats on and off) based on signals output from control device 11. In the present embodiment, switching element 16 includes an n channel metal oxide semiconductor field-effect transistor (MOSFET).

Control device 11 turns on and off switching element 16. Control device 11 controls switching element 16 according to a duty cycle (OnDuty) determined based on an output value detected by output detector 13, if a current value detected by current detector 12 is less than predetermined threshold Ith. If the current value is greater than threshold Ith, control device 11 controls switching element 16 according to a duty cycle lower than the duty cycle based on the output value. Threshold Ith may be equal to or less than an absolute maximum current rating of switching element 16. This prevents a current greater than the absolute maximum rating from flowing through switching element 16. Furthermore, threshold Ith may be greater than or equal to a peak value of a current which flows through switching element 16 if a rated voltage of lighting device 1 is steadily input to lighting device 1. In this manner, control device 11 controls switching element 16 at a fixed frequency and for a fixed on time during steady operation, thus achieving a higher effect of improving a power factor of lighting device 1. Control device 11 turns on and off switching element 16 by outputting control signals to the gate electrode of switching element 16. In the present embodiment, control device 11 includes feedback circuit 110, overcurrent preventer circuit 111, and drive circuit 112.

Drive circuit 112 drives switching element 16. Drive circuit 112 has an input terminal connected to terminals of resistors 113 and 114 and the collector electrode of transistor 115, and an output terminal connected to the gate electrode of switching element 16. Drive circuit 112 amplifies an input signal and outputs the resultant signal to the gate electrode of switching element 16, as a control signal. In this manner, drive circuit 112 drives switching element 16.

Feedback circuit 110 performs feedback control of an output current from DC-to-DC converter 10 (i.e., an output current from lighting device 1) into a predetermined magnitude. In the present embodiment, feedback circuit 110 has terminal FB into which a signal from output detector 13 is input, and terminal OUT through which signals for turning on and off switching element 16 are output. Feedback circuit 110 outputs signals for turning on and off switching element 16 from terminal OUT to drive circuit 112, thus turning on and off switching element 16 according to a duty cycle determined based on an output value detected by output detector 13. The following describes a configuration of feedback circuit 110 with reference to FIG. 2.

Figure 2:
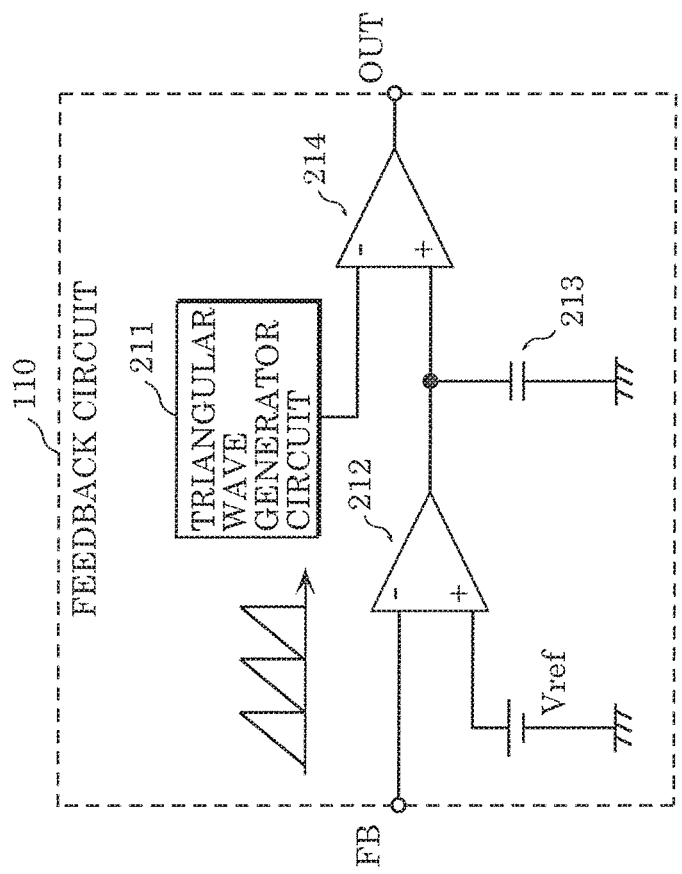
FIG. 2 is a circuit diagram illustrating a configuration of a feedback circuit according to Embodiment 1.

FIG. 2 is a circuit diagram illustrating a configuration of feedback circuit 110 according to the present embodiment.

As illustrated in FIG. 2, feedback circuit 110 includes triangular wave generator circuit 211, error amplifier 212, capacitor 213, and comparator 214.

Triangular wave generator circuit 211 is a circuit which outputs triangular waveform signals (i.e., a circuit which repeatedly outputs a ramp signal in a predetermined cycle). A cycle of such triangular wave-form signals corresponds to a switching period of switching element 16. An output signal from triangular wave generator circuit 211 is input to the inverting input terminal of comparator 214.

Error amplifier 212 is a circuit which amplifies an error between reference voltage Vref and a voltage of a signal from output detector 13 input to terminal FB, and outputs the amplified error. A signal from output detector 13 which is input to terminal FB is input to the inverting input terminal of error amplifier 212, and reference voltage Vref is input to the non-inverting input terminal of error amplifier 212. Reference voltage Vref corresponds to a target value of an output current from DC-to-DC converter 10 (i.e., an output current from lighting device 1). Error amplifier 212 amplifies an error between reference voltage Vref and a voltage of a signal from output detector 13 corresponding to an output current from DC-to-DC converter 10, and outputs the amplified error to the non-inverting input terminal of comparator 214. Error amplifier 212 increases an output voltage if the voltage of a signal input from terminal FB is lower than reference voltage Vref, whereas if the voltage of a signal input from terminal FB is greater than reference voltage Vref, error amplifier 212 decreases an output voltage.

Capacitor 213 is an element for smoothing an output voltage from error amplifier 212. In the present embodiment, capacitor 213 has one terminal connected to the output terminal of error amplifier 212 and the non-inverting input terminal of comparator 214, and another grounded terminal. Capacitor 213 reduces, for instance, noise components included in an output signal from error amplifier 212, and also compensates a phase of a control loop of feedback circuit 110. Note that an impedance circuit which is a combination of a capacitor and a resistor, for instance, may be used instead of capacitor 213.

Comparator 214 is a circuit which compares an output signal from triangular wave generator circuit 211 with an output signal from error amplifier 212, and outputs a pulse width modulation (PWM) signal. An output signal from triangular wave generator circuit 211 is input to the inverting input terminal of comparator 214, and an output signal from error amplifier 212 is input to the non-inverting input terminal of comparator 214. An output signal from comparator 214 is output to terminal OUT of feedback circuit 110.

Note that feedback circuit 110 which has the configuration as described above may include an integrated circuit (IC).

Overcurrent preventer circuit 111 is a circuit which prevents an excessive current from flowing through switching element 16. As illustrated in FIG. 1, overcurrent preventer circuit 111 includes resistors 113, 114, 117, and 118, transistor 115, and capacitor 116.

Resistors 117 and 118 and capacitor 116 are elements included in an RC filter circuit. A signal from current detector 12 is input to the base electrode of transistor 115 via the RC filter circuit.

Resistor 113 is an element for preventing an excessive current from flowing from terminal OUT of feedback circuit 110. Resistor 113 has one terminal connected to terminal OUT of feedback circuit 110, and another terminal connected to the input terminal of drive circuit 112 and one terminal of resistor 114. In this manner, if transistor 115 is turned on, terminal OUT of feedback circuit 110 is grounded via resistor 113, rather than being directly grounded. This prevents an excessive current from flowing from terminal OUT of feedback circuit 110 due to terminal OUT of feedback circuit 110 being directly grounded.

Resistor 114 is an element which divides a voltage of an output signal from terminal OUT of feedback circuit 110, together with resistor 113. Resistor 114 has a terminal connected to the other terminal of resistor 113 and the input terminal of drive circuit 112, and another grounded terminal. Resistors 113 and 114 divide a voltage of an output signal from terminal OUT, and thus can input a desired voltage to drive circuit 112.

Transistor 115 is an element connected to drive circuit 112, and is controlled based on a signal from current detector 12. In the present embodiment, transistor 115 is a negative-positive-negative (npn) bipolar transistor. A signal from current detector 12 is input to the base electrode of transistor 115, the collector electrode of transistor 115 is connected to the input terminal of drive circuit 112, and the emitter electrode of transistor 115 is grounded. Transistor 115 is turned on if a current which flows through switching element 16 is greater than predetermined threshold Ith, or in other words, if a voltage of a signal from current detector 12 is greater than a voltage corresponding to threshold Ith. In this case, since the input terminal of drive circuit 112 is grounded, a voltage of an input signal from drive circuit 112 is decreased to zero, and an output signal from drive circuit 112 is also decreased to zero. Accordingly, a voltage input to the gate electrode of switching element 16 is decreased to zero, and thus switching element 16 is turned off. As a result, a current which flows through switching element 16 also goes to zero.

1-2. Operation

The following describes operation of lighting device 1 according to the present embodiment with reference to the drawings.

Figure 3:
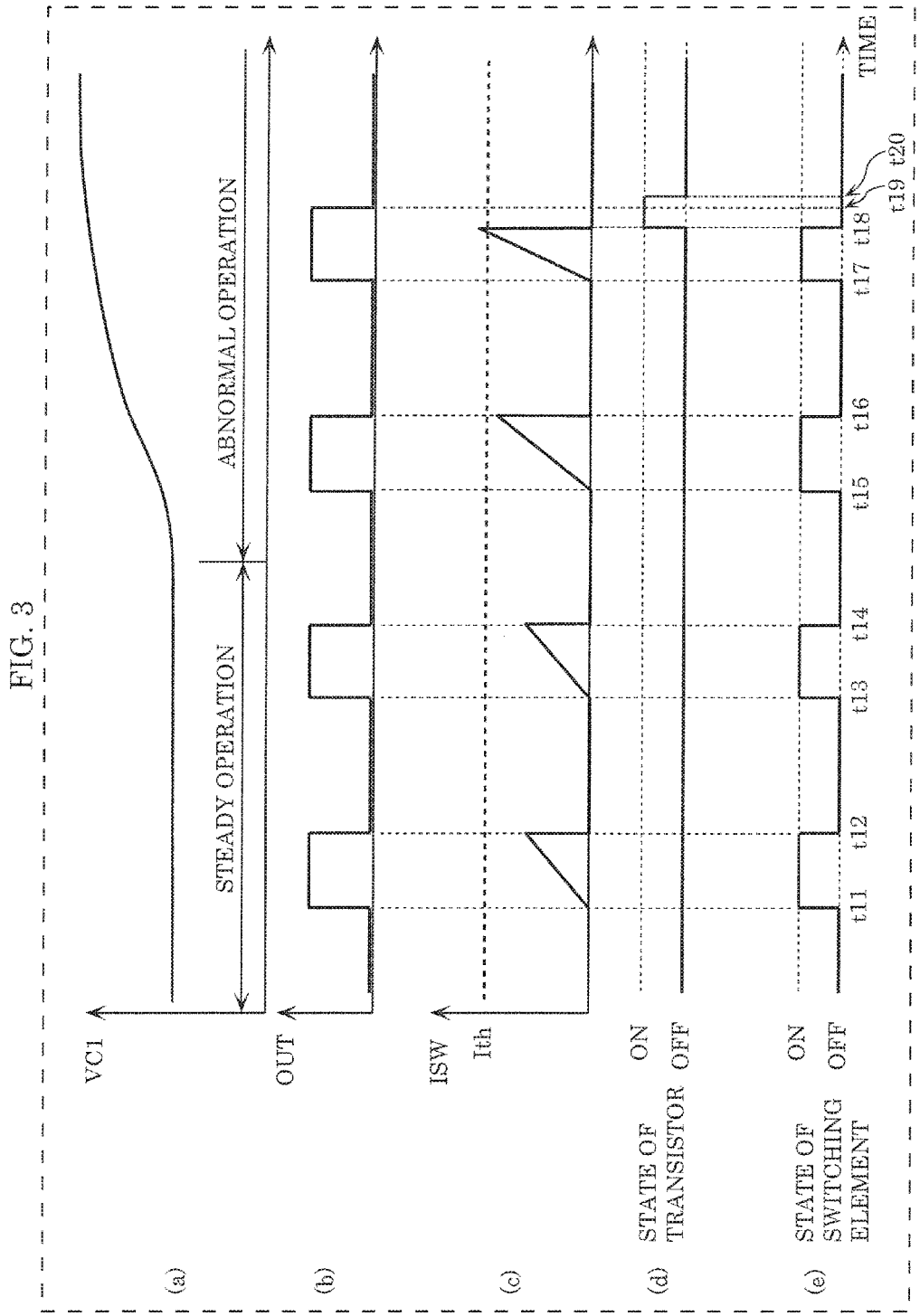
FIG. 3 is a timing chart schematically illustrating operation of the lighting device according to Embodiment 1.

FIG. 3 is a timing chart schematically illustrating operation of lighting device 1 according to the present embodiment. Graph (a) in FIG. 3 illustrates a waveform of voltage VC1 applied to capacitor 14 of lighting device 1. Graph (b) in FIG. 3 illustrates a waveform of output signal (OUT) from terminal OUT of feedback circuit 110. Graph (c) in FIG. 3 illustrates a waveform of current ISW which flows through switching element 16. Graph (d) in FIG. 3 illustrates a waveform showing the state of transistor 115. Graph (e) in FIG. 3 illustrates a waveform showing the state of switching element 16.

As illustrated in graph (a) in FIG. 3, abnormal operation may arise in lighting device 1 in place of steady operation. During steady operation, AC power supply 3 operates normally, and voltage VC1 is substantially constant (see the waveform until time t14 in FIG. 3). In contrast, voltage VC1 shows an abnormal increase (see the waveform after time t15 in FIG. 3) during abnormal operation, due to, for instance, abnormality of AC power supply 3.

Abnormal operation arises when an input voltage to lighting device 1 is unstable due to, for instance, a sudden change in the output voltage of AC power supply 3, on/off switching operation of a power switch of lighting device 1, and poor contact of the power switch. If an input voltage to lighting device 1 is unstable, resonance in an LC circuit in lighting device 1 generates a voltage higher than the input voltage in DC-to-DC converter 10. When diode 19 is conducting, the resonance occurs in an LC circuit which includes inductor 15 and capacitors 14, 17, and 20, and when diode 19 is not conducting, the resonance occurs in an LC circuit which includes inductors 15 and 18 and capacitors 14 and 17. In particular, if a voltage higher than the input voltage is generated in capacitor 14, the waveform of current ISW which flows through switching element 16 has a steep slope, and thus a current greater than a current that flows during steady operation flows through switching element 16. A current greater than a current that flows during steady operation flows through inductors 15 and 18, which may saturate the cores of inductors 15 and 18, and thus even a greater current may flow. Switching element 16 receives stress by an above-mentioned excessive current flowing through switching element 16. Furthermore, switching element 16 may be broken if the value of such an excessive current exceeds the absolute maximum rating of switching element 16.

In the state of steady operation, a signal which has a cycle determined by triangular wave generator circuit 211 of feedback circuit 110, and a duty cycle determined by feedback circuit 110 based on an output value detected by output detector 13 is output from terminal OUT of feedback circuit 110 (see graph (b) in FIG. 3).

A signal output from terminal OUT of feedback circuit 110 is amplified by drive circuit 112, and the amplified signal is input to the gate electrode of switching element 16. Switching element 16 is maintained in the on state during a period where an output signal from terminal OUT is at a high level (see graph (e) in FIG. 3). In the example illustrated in FIG. 3, switching period T of switching element 16 is a period from time t11 to time t13, for example. Further, on period Ton of switching element 16 is a period from time t11 to time t12, for example. Accordingly, the duty cycle of switching element 16 during steady operation is expressed by Ton/T.

A current which flows through switching element 16 when switching element 16 is maintained in the on state during time t is expressed by Expression 1 below, where L1 denotes an inductance of inductor 15.

$$ISW = VC1 \times t / L1 \qquad \text{(Expression 1)}$$

According to Expression 1 shown above, peak value ISW_p of a current flowing through switching element 16 is expressed by VC1×Ton/L1, where Ton denotes the on period of switching element 16. During steady operation, voltage VC1 applied to capacitor 14, or in other words, a voltage input to lighting device 1 is less than or equal to the rated voltage of lighting device 1, and thus ISW_p which is the maximum value does not exceed threshold Ith. Accordingly, transistor 115 of overcurrent preventer circuit 111 is maintained in the off state (see graph (d) in FIG. 3).

In the state of abnormal operation, voltage VC1 increases abnormally as illustrated in graph (a) in FIG. 3. Accordingly, as illustrated in graph (c) in FIG. 3, current ISW which flows through switching element 16 during the on period of switching element 16 (time t15 to t16 and time t17 to t18 in FIG. 3) has a steeper slope than the slope during steady operation. Accordingly, peak value ISW_p of current ISW is also greater than peak value ISW_p during steady operation. Furthermore, if voltage VC1 is greater than the rated voltage of lighting device 1, current ISW may exceed threshold Ith. In the example illustrated in graph (c) in FIG. 3, current ISW exceeds threshold Ith at time t18. This turns on transistor 115 of overcurrent preventer circuit 111 (see graph (d) in FIG. 3), and thus the input terminal of drive circuit 112 is grounded, and a voltage of an output signal from drive circuit 112 reaches zero. Accordingly, switching element 16 is turned off (see graph (e) in FIG. 3). As a result, a current which flows through switching element 16 reaches zero. In other words, the on period of switching element 16 is shortened from on period Ton during steady operation to on period Ton' between time t17 and time t18. Accordingly, the duty cycle of switching element 16 is expressed by Ton'/T, which is lower than the duty cycle during steady operation. Lighting device 1 can prevent an excessive current from flowing through switching element 16 by the above operation

1-3. Comparative Example

The following describes the configuration and operation of a lighting device which does not include current detector 12 and overcurrent preventer circuit 111 according to the present embodiment with reference to the drawings, to facilitate the understanding of advantageous effects achieved by lighting device 1 according to the present embodiment.

Figure 4:
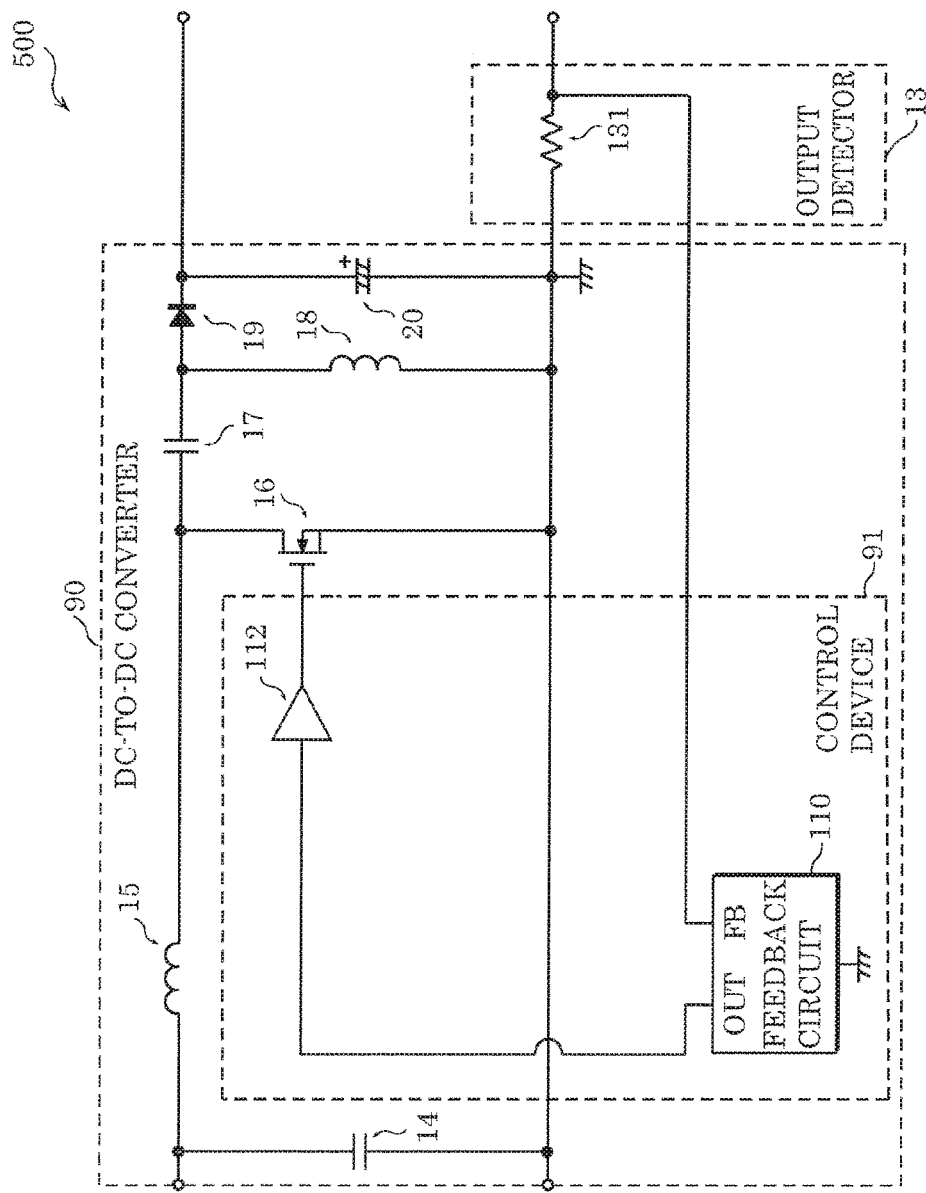
FIG. 4 is a circuit diagram illustrating a configuration of a lighting device according to a comparative example.

FIG. 4 is a circuit diagram illustrating the configuration of lighting device 500 according to a comparative example.

As illustrated in FIG. 4, lighting device 500 according to the comparative example includes DC-to-DC converter 90 and output detector 13. DC-to-DC converter 90 includes control device 91. Lighting device 500 differs from lighting device 1 according to the present embodiment in that DC-to-DC converter 90 does not include current detector 12 and overcurrent preventer circuit 111, and is the same as lighting device 1 in other respects. Thus, in lighting device 500, switching element 16 is controlled for all the time according to a switching period and a duty cycle which are determined by feedback circuit 110.

Figure 5:
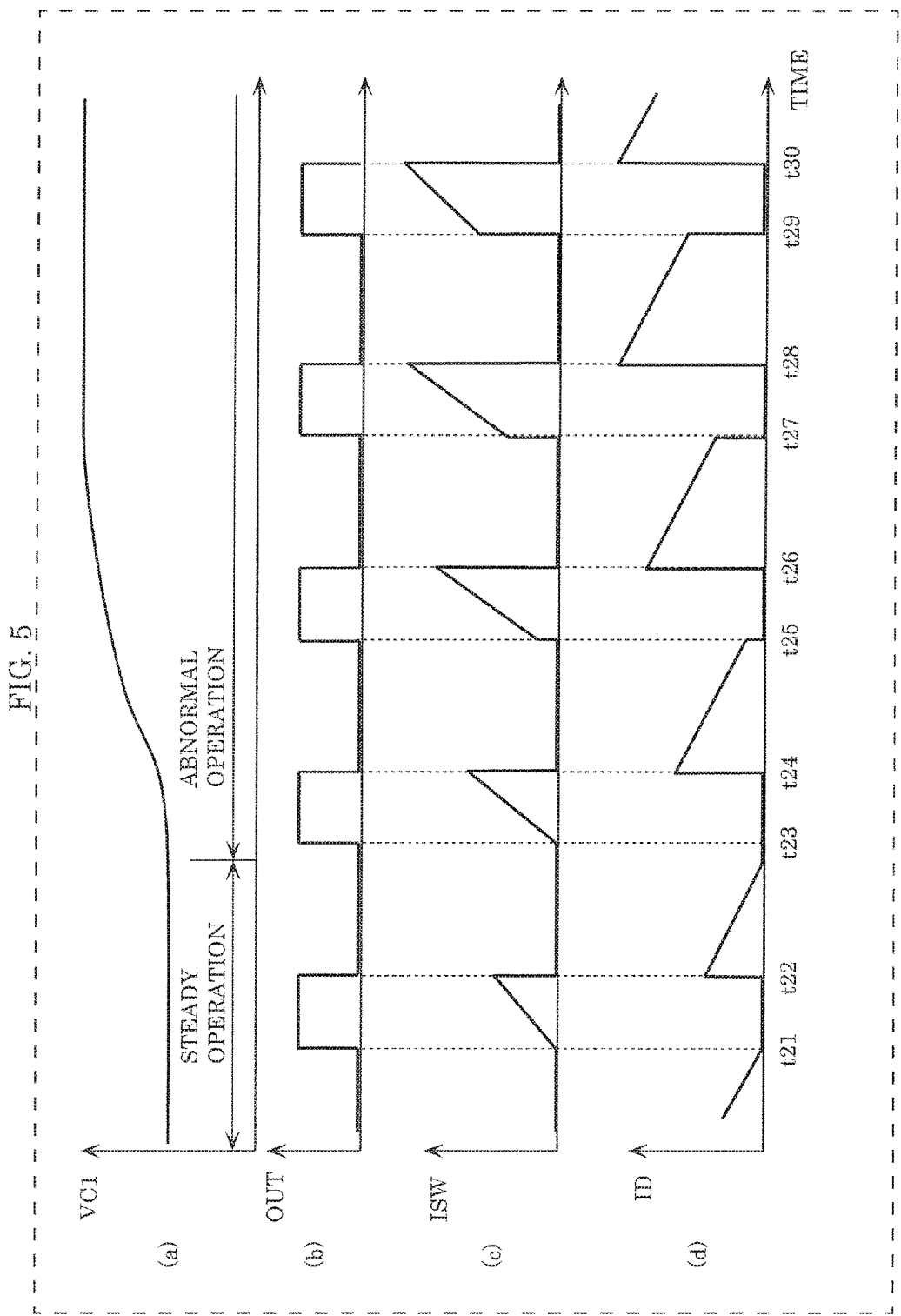
FIG. 5 is a timing chart schematically illustrating operation of the lighting device according to the comparative example.

The following describes operation of lighting device 500 with reference to FIG. 5.

FIG. 5 is a timing chart schematically illustrating operation of lighting device 500 according to the comparative example. Graph (a) in FIG. 5 illustrates a waveform of voltage VC1 applied to capacitor 14 of lighting device 500. Graph (b) in FIG. 5 illustrates a waveform of an output signal (OUT) from terminal OUT of feedback circuit 110. Graph (c) in FIG. 5 illustrates a waveform of current ISW which flows through switching element 16. Graph (d) in FIG. 5 illustrates a waveform of current ID which flows through diode 19.

As illustrated in graphs (a) and (b) in FIG. 5, the waveforms of voltage VC1 and a signal from terminal OUT according to the comparative example are the same as those of the present embodiment. The waveform of current ISW, however, is different from the waveform of current ISW of the present embodiment. Lighting device 500 does not include overcurrent preventer circuit 111, and thus during abnormal operation, current ISW increases with voltage VC1 and is not limited, as illustrated in graphs (a) and (c) in FIG. 5. Furthermore, in the example illustrated in FIG. 5, current ID also increases with current ISW and does not reach zero in the off period of switching element 16 after time t24. Specifically, after time t24, lighting device 500 operates in a continuous mode (CCM: continuous current mode). Accordingly, current ISW is not zero when the on period of switching element 16 starts (for example, at times t25, t27, and t29 in FIG. 5), and thus the peak value of current ISW further increases. As described above, lighting device 500 according to the comparative example does not include current detector 12 and overcurrent preventer circuit 111, and thus an excessive current may flow through switching element 16 during abnormal operation. In contrast, lighting device 1 according to the present embodiment includes current detector 12 and overcurrent preventer circuit 111, and thus prevents an excessive current from flowing through switching element 16, as illustrated in FIG. 3.

1-4. Advantageous Effects and Others

Lighting device 1 according to the present embodiment includes DC-to-DC converter 10, and output detector 13 which detects an output from DC-to-DC converter 10, as described above. DC-to-DC converter 10 includes switching element 16, control device 11 which turns on and off switching element 16 in order to generate the output, and current detector 12 which detects a current which flows through switching element 16. If the current value of a current detected by current detector 12 is less than a predetermined threshold, control device 11 controls switching element 16 according to a duty cycle determined based on an output value of the output detected by output detector 13. If a current value is greater than the threshold, control device 11 controls switching element 16 according to a duty cycle lower than the duty cycle determined based on the output value.

Accordingly, even if a voltage input to DC-to-DC converter 10 of lighting device 1 suddenly changes, lighting device 1 can prevent an excessive current from flowing through switching element 16 included in DC-to-DC converter 10.

Furthermore, in lighting device 1 according to the present embodiment, DC-to-DC converter 10 increases or decreases an input voltage, based on characteristics of LED 2, and outputs the increased or decreased input voltage.

Accordingly, lighting device 1 can increase and decrease a voltage, thus expanding the dynamic range of an output voltage. Lighting device 1 is thus allowed to include LEDs 2 having a wide range of forward voltages. Furthermore, a power-factor of lighting device 1 can be improved.

In lighting device 1 according to the present embodiment, DC-to-DC converter 10 may be a SEPIC converter.

In lighting device 1 according to the present embodiment, a threshold is less than or equal to the absolute maximum current rating of switching element 16, and is greater than or equal to a current which flows through switching element 16 when a rated voltage of lighting device 1 is steadily input to lighting device 1.

This prevents a current that exceeds the absolute current maximum rating from flowing through switching element 16. Accordingly, switching element 16 is prevented from being broken due to an excessive current. Furthermore, switching element 16 is controlled at a fixed frequency and for a fixed on time during steady operation, thus achieving improved effects of a power factor of lighting device 1.

In lighting device 1 according to the present embodiment, if a current value is greater than the threshold, control device 11 may make the on period of switching element 16 shorter than the on period for when a current value is less than the threshold.

Furthermore, in lighting device 1 according to the present embodiment, control device 11 may turn switching element 16 off when a current value is greater than the threshold.

Furthermore, in lighting device 1 according to the present embodiment, control device 11 may include drive circuit 112 which drives switching element 16, and transistor 115 connected to drive circuit 112, and if the current value is greater than the predetermined threshold, control device 11 may turn switching element 16 off by turning on transistor 115.

Variation 1 of Embodiment 1

The following describes a lighting device according to Variation 1 of Embodiment 1 described above. In lighting device 1 according to Embodiment 1 described above, switching element 16 may be immediately turned off if current ISW which flows through switching element 16 exceeds threshold Ith, in order to prevent damage to switching element 16 due to a flow of an excessive current. Accordingly, in overcurrent preventer circuit 111 of lighting device 1 according to Embodiment 1 described above, an RC filter which includes capacitor 116 and resistors 117 and 118 may have a small time constant. If the time constant of the RC filter is comparatively small, current ISW exceeds threshold Ith and switching element 16 is turned off, and thereafter a voltage applied to the base electrode of transistor 115 falls for a comparatively short time. Transistor 115 is turned off again due to a fall of a voltage applied to the base electrode of transistor 115. When transistor 115 is turned off again, if a high level signal is output from terminal OUT of feedback circuit 110, switching element 16 is turned on again. In this manner, switching element 16 may be repeatedly turned on and off while a high level signal is output from terminal OUT during period Ton. In view of this, this variation describes a lighting device which includes an overcurrent preventer circuit that prevents occurrence of the above phenomenon by maintaining switching element 16 in the off state for a fixed time period. Note that the lighting device according to this variation differs from lighting device 1 according to Embodiment 1 described above in the configuration of the overcurrent preventer circuit, and is the same as lighting device 1 in other respects. Thus, a description is given here focusing on the overcurrent preventer circuit of the lighting device according to this variation.

Figure 6:
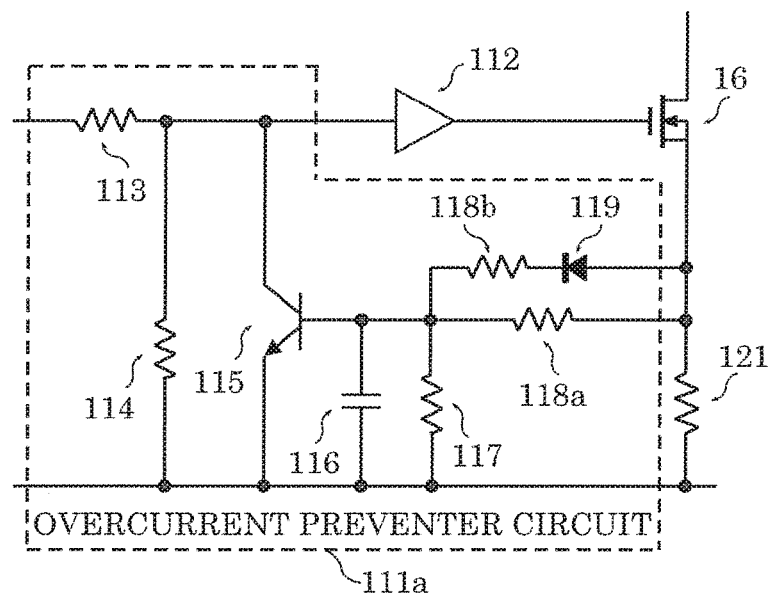
FIG. 6 is a circuit diagram illustrating a configuration of an overcurrent preventer circuit according to Variation 1 of Embodiment 1.

FIG. 6 is a circuit diagram illustrating a configuration of overcurrent preventer circuit 111a according to this variation. FIG. 6 also illustrates peripheral elements such as switching element 16, in addition to overcurrent preventer circuit 111a.

As illustrated in FIG. 6, overcurrent preventer circuit 11a differs from overcurrent preventer circuit 111 according to Embodiment 1 described above in the configuration of the RC filter, and is the same as overcurrent preventer circuit 111 in other respects. Specifically, the RC filter in overcurrent preventer circuit 111a according to this variation includes capacitor 116, resistors 117, 118a, and 118b, and diode 119.

The RC filter of overcurrent preventer circuit 111a has the above configuration, and thus if current ISW which flows through switching element 16 exceeds threshold Ith, the anode electrode of diode 119 has a potential higher than the cathode electrode, which brings diode 119 into a conducting state. In this case, an electric charge is accumulated in capacitor 116 via the junction between switching element 16 and resistor 121, through resistors 118a and 118b which are connected in parallel. Then, transistor 115 is turned on if a potential of a high-potential terminal of capacitor 116, or in other words, a potential of the base electrode of transistor 115 exceeds a predetermined potential.

If switching element 16 is turned off by turning on transistor 115, a current which flows through resistor 121 reaches zero, and a potential at the junction between switching element 16 and resistor 121, or in other words, a potential of the anode electrode of diode 119 reaches zero. In this case, the potential of the cathode electrode of diode 119 is decreased over a time constant determined by capacitor 116, for instance. The potential of the anode electrode of diode 119 becomes lower than the potential of the cathode electrode, thus bringing diode 119 into the non-conducting state. Here, resistor 121 has a small resistance which may be ignored, compared with the resistance of resistor 118a. Accordingly, the electric charge accumulated in capacitor 116 can be considered as flowing into a ground via resistor 118a and resistor 117 which are connected in parallel. Here, the resistance of resistor 117 is increased above the resistance of resistor 118b, thus increasing a combined resistance of resistors 118a and 117 connected in parallel above a combined resistance of resistors 118a and 118b. Accordingly, a time constant of the RC filter for when an electric charge is discharged from capacitor 116 can be increased above a time constant of the RC filter for when an electric charge is accumulated in capacitor 116. This achieves overcurrent preventer circuit 111a with which a time from when current ISW is less than threshold Ith until when transistor 115 is turned off is longer than a time from when current ISW exceeds threshold Ith until when transistor 115 is turned on. As described above, in overcurrent preventer circuit 111a according to this variation, switching element 16 can be maintained in the off state for a fixed time period after current ISW exceeds threshold Ith.

Variation 2 of Embodiment 1

The following describes a lighting device according to Variation 2 of Embodiment 1. According to lighting device 1 according to Embodiment 1 described above, threshold Ith of current ISW which flows through switching element 16 is a value corresponding to the base voltage at which transistor 115 is turned on, yet threshold Ith may not be a value corresponding to the base voltage. This variation describes a lighting device according to which threshold Ith is a given value independent of the characteristics of transistor 115. Note that the lighting device according to this variation differs from lighting device 1 according to Embodiment 1 described above in the configuration of the overcurrent preventer circuit, and is the same as lighting device 1 in other respects. Thus, a description is given here focusing on an overcurrent preventer circuit of the lighting device according to this variation.

Figure 7:
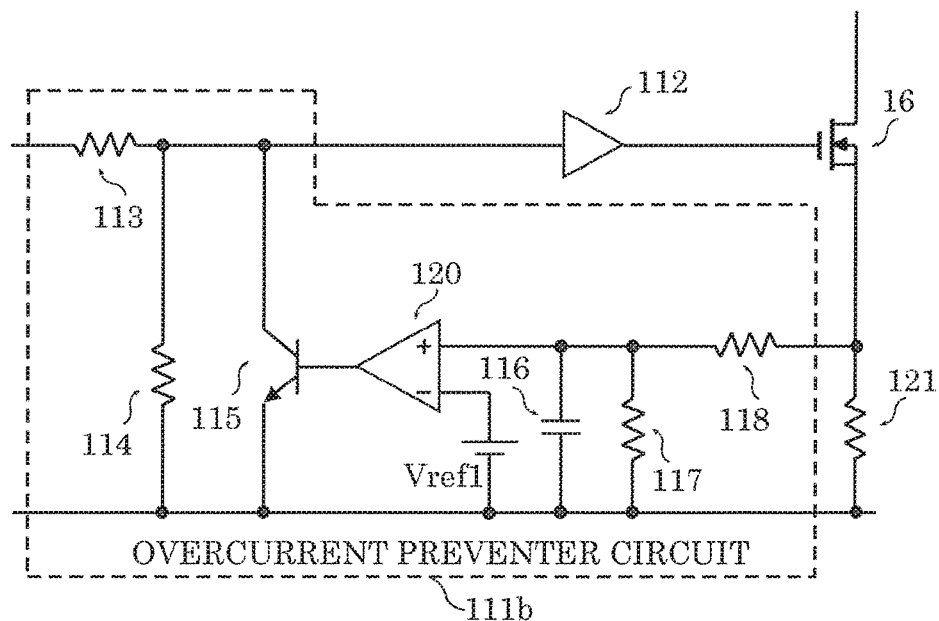
FIG. 7 is a circuit diagram illustrating a configuration of an overcurrent preventer circuit according to Variation 2 of Embodiment 1.

FIG. 7 is a circuit diagram illustrating a configuration of overcurrent preventer circuit 111b according to this variation. FIG. 7 also illustrates peripheral elements such as switching element 16, in addition to overcurrent preventer circuit 111b.

As illustrated in FIG. 7, overcurrent preventer circuit 111b differs from overcurrent preventer circuit 111 according to Embodiment 1 described above in that comparator 120 is included, and is the same as overcurrent preventer circuit 111 in other respects. In overcurrent preventer circuit 111b, a high-potential terminal of capacitor 116 is connected to the non-inverting input terminal of comparator 120. Comparator 120 compares a voltage at the high-potential terminal of capacitor 116 with reference voltage Vref1 input to the inverting input terminal of comparator 120, and the output from comparator 120 is input to the base electrode of transistor 115.

According to the above configuration, overcurrent preventer circuit 111b turns off switching element 16 by turning on transistor 115 when a voltage corresponding to a current flowing through switching element 16 is greater than reference voltage Vref1. In other words, threshold Ith can be set to a value corresponding to reference voltage Vref1 which is independent of the characteristics of transistor 115, in overcurrent preventer circuit 111b. Furthermore, the above configuration of overcurrent preventer circuit 111b reduces variations in threshold Ith due to temperature dependence and individual difference of the characteristics of transistor 115.

Note that although this variation has described a configuration in which a comparator is used as an example of a configuration in which a value other than the base voltage at which transistor 115 is turned on is used as a threshold, the configuration of the overcurrent preventer circuit is not limited to this. For example, a threshold voltage of a MOSFET in place of transistor 115 may be used as a threshold.

Variation 3 of Embodiment 1

The following describes a lighting device according to Variation 3 of Embodiment 1. This variation describes a lighting device which further stabilizes an output current from DC-to-DC converter 10 by including a constant current circuit downstream of DC-to-DC converter 10 of lighting device 1 according to Embodiment 1 described above.

Figure 8:
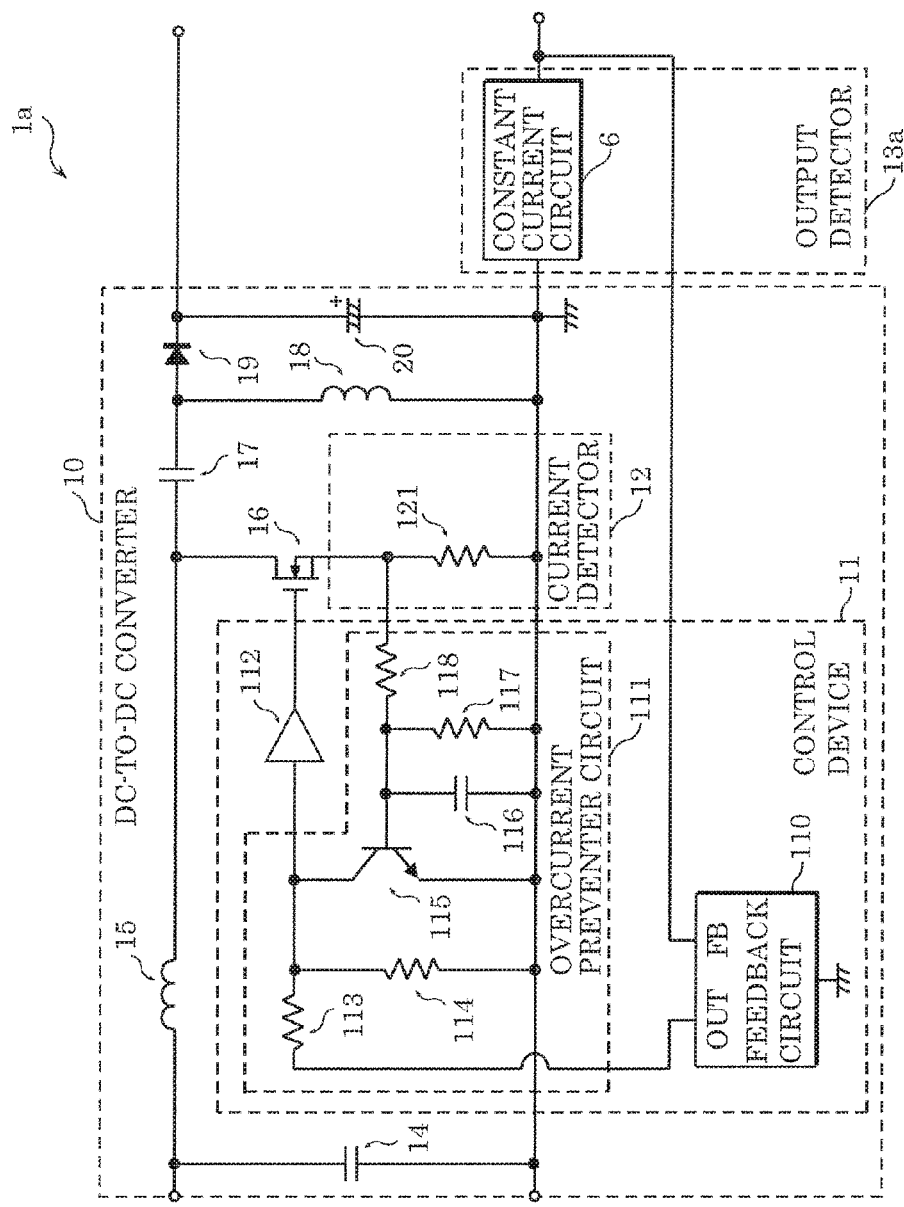
FIG. 8 is a circuit diagram illustrating a configuration of a lighting device according to Variation 3 of Embodiment 1.

FIG. 8 is a circuit diagram illustrating a configuration of lighting device 1a according to this variation.

Figure 9:
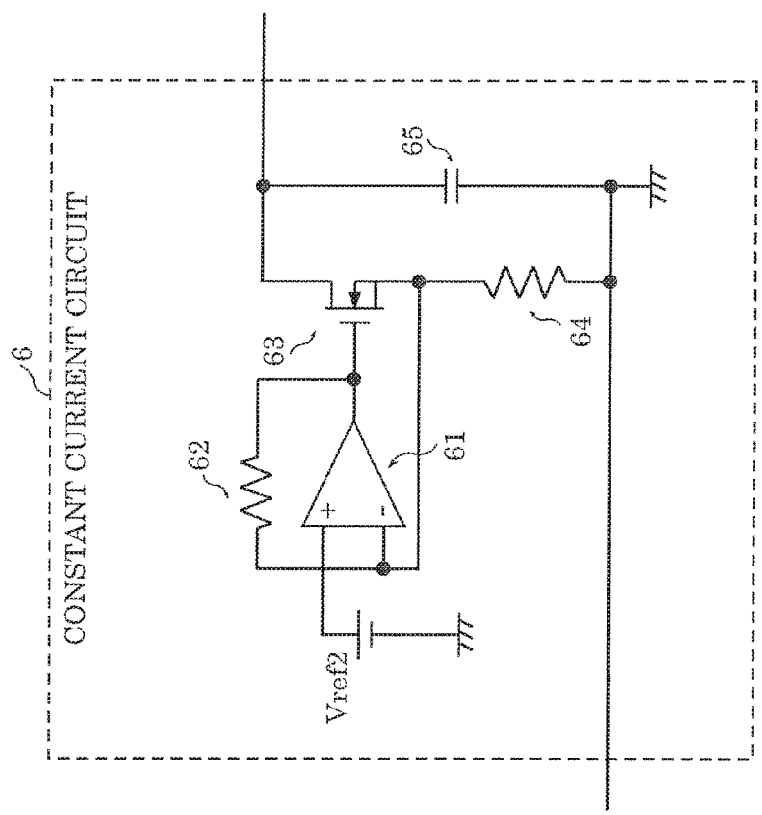
FIG. 9 is a circuit diagram illustrating a configuration of a constant current circuit according to Variation 3 of Embodiment 1.

FIG. 9 is a circuit diagram illustrating a configuration of constant current circuit 6 according to this variation.

As illustrated in FIG. 8, lighting device 1a according to this variation includes output detector 13a which includes constant current circuit 6, instead of output detector 13 which includes resistor 131 of lighting device 1 according to Embodiment 1 described above. Accordingly, a potential difference between the terminals of constant current circuit 6 is input to terminal FB of feedback circuit 110. As illustrated in FIG. 9, constant current circuit 6 includes comparator 61, resistors 62 and 64, switching element 63, and capacitor 65. Reference voltage Vref2 is input to the non-inverting input terminal of comparator 61, whereas a voltage applied to resistor 64 is input to the inverting input terminal of comparator 61. Here, resistor 64 is a sense resistor for detecting an output current from DC-to-DC converter 10. The output terminal of comparator 61 is connected to the gate electrode of switching element 63 which includes a MOSFET. Furthermore, the output terminal and the inverting input terminal of comparator 61 are connected via resistor 62. Capacitor 65 is connected between the input and output terminals of constant current circuit 6, thus smoothing a voltage applied to constant current circuit 6, or in other words, a current which flows through resistor 64. The above configuration of constant current circuit 6 allows switching element 63 to be controlled such that a voltage applied to resistor 64 is equal to reference voltage Vref2. Accordingly, constant current circuit 6 further stabilizes an output current from DC-to-DC converter 10, or in other words, an output current from lighting device 1. Specifically, constant current circuit 6 reduces ripples included in a direct voltage input to lighting device 1, and having a frequency twice the frequency of AC power supply 3.

Variation 4 of Embodiment 1

The following describes a lighting device according to Variation 4 of Embodiment 1. This variation describes a lighting device which further stabilizes an output current from DC-to-DC converter 10 by further including another DC-to-DC converter downstream of DC-to-DC converter 10 of lighting device 1 according to Embodiment 1 described above.

Figure 10:
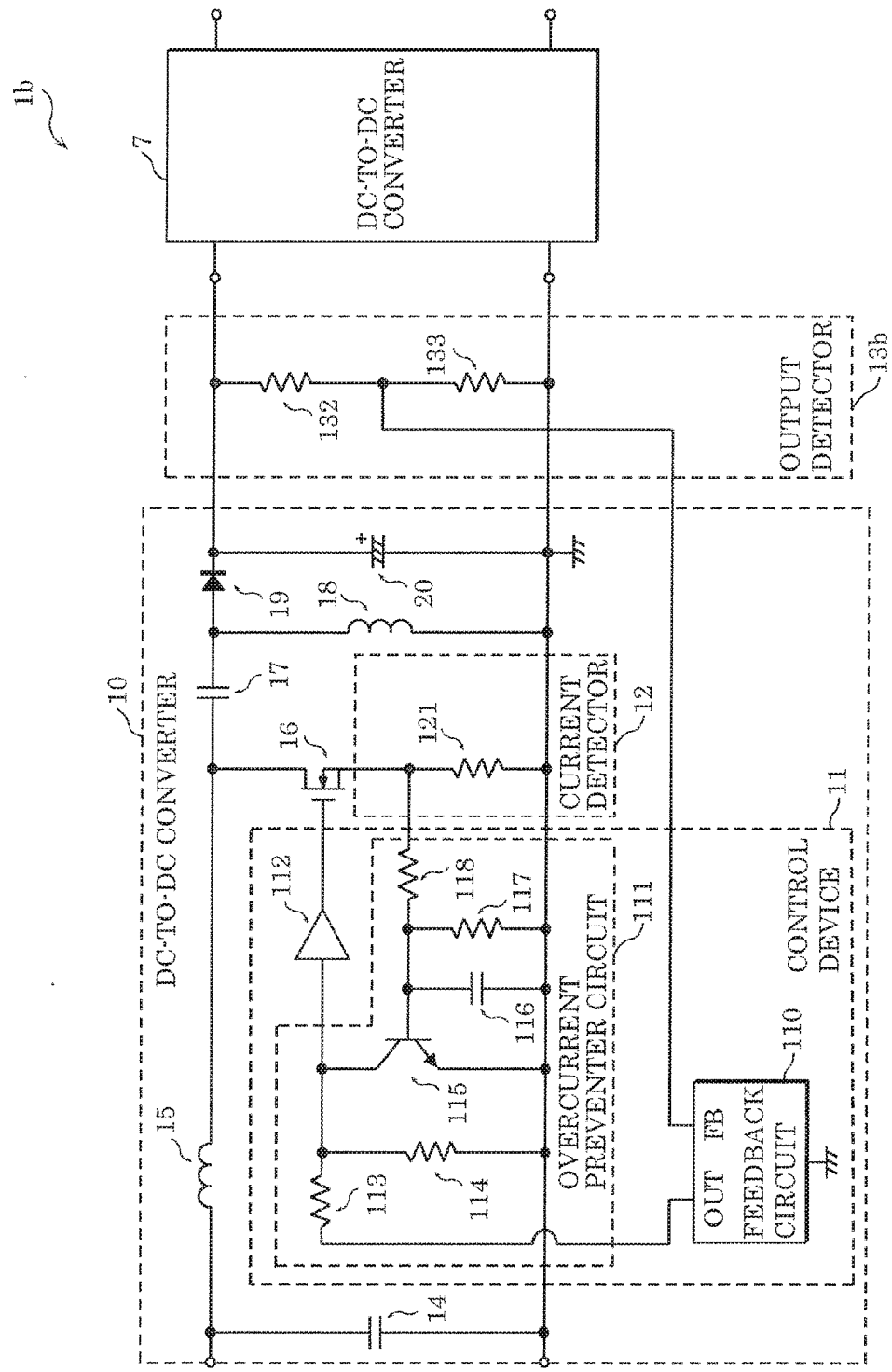
FIG. 10 is a circuit diagram illustrating a configuration of a lighting device according to Variation 4 of Embodiment 1.

FIG. 10 is a circuit diagram illustrating a configuration of lighting device 1b according to this variation.

As illustrated in FIG. 10, another DC-to-DC converter 7 is further connected downstream of DC-to-DC converter 10 in lighting device 1b according to this variation. Furthermore, in lighting device 1b, output detector 13b detects an input voltage to DC-to-DC converter 7, or in other words, an output voltage from DC-to-DC converter 10, in order to stabilize an input voltage to DC-to-DC converter 7.

Output detector 13b includes resistors 132 and 133, and resistors 132 and 133 divide an output voltage from DC-to-DC converter 10. Output detector 13b outputs the divided voltage to terminal FB of feedback circuit 110 as a detected value.

DC-to-DC converter 7 is a circuit to which an output voltage of DC-to-DC converter 10 is input, and which outputs a current to a solid-state light emitting element. Any of a variety of types of DC-to-DC converters may be used as appropriate as DC-to-DC converter 7. For example, a back converter may be used.

As described above, in lighting device 1b according to this variation, another DC-to-DC converter 7 is further connected downstream of DC-to-DC converter 10. Accordingly, downstream DC-to-DC converter 7 prevents a fall of an output current to a solid-state light emitting element even if an output voltage from DC-to-DC converter 10 temporarily decreases due to momentary power failure, for instance. Accordingly, lighting device 1b can further stabilize an output current to a solid-state light emitting element.

Furthermore, in lighting device 1b, any of a variety of types of DC-to-DC converters may be used as DC-to-DC converter 7, and DC-to-DC converters 7 and 10 can be individually controlled. This increases the flexibility of control of lighting device 1b.

Embodiment 2

The following describes a lighting device according to Embodiment 2. Lighting device 1 according to Embodiment 1 described above has a configuration in which if an excessive current flows through switching element 16, overcurrent preventer circuit 111 prevents a signal output from terminal OUT of feedback circuit 110 from being input to drive circuit 112. In the present embodiment, instead of such a configuration, a configuration is adopted in which a signal output from terminal OUT of feedback circuit 110 is dropped if an excessive current flows through switching element 16. Specifically, the adopted configuration is to shorten the on period of switching element 16 determined by feedback circuit 110 if an excessive current flows through switching element 16. The lighting device according to the present embodiment differs from lighting device 1 according to Embodiment 1 described above in the configurations of the overcurrent preventer circuit and the feedback circuit, and is the same as lighting device 1 according to Embodiment 1 described above in other respects. Thus, the following mainly describes the overcurrent preventer circuit and the feedback circuit of the lighting device according to the present embodiment.

2-1. Configuration

Described first is a configuration of the lighting device according to the present embodiment, with reference to the drawings.

Figure 11:
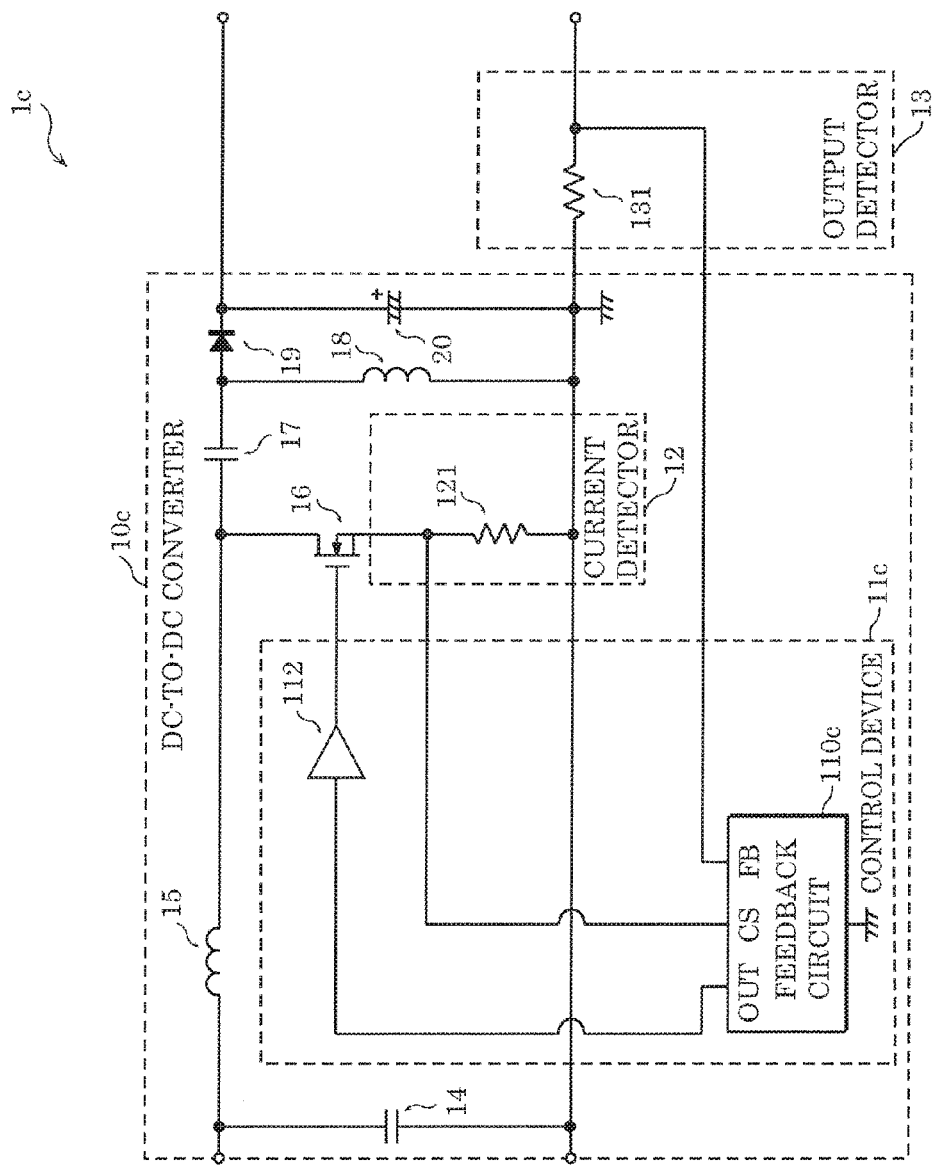
FIG. 11 is a circuit diagram illustrating a configuration of a lighting device according to Embodiment 2.

FIG. 11 is a circuit diagram illustrating a configuration of lighting device 1c according to the present embodiment.

Figure 12:
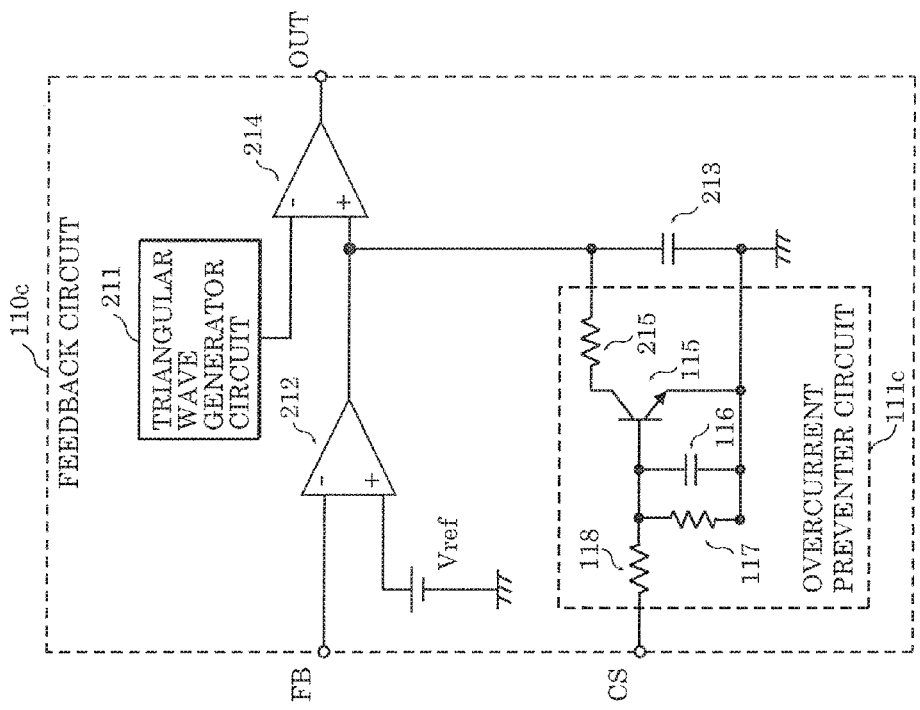
FIG. 12 is a circuit diagram illustrating a configuration of a feedback circuit according to Embodiment 2.

FIG. 12 is a circuit diagram illustrating a configuration of feedback circuit 110c according to the present embodiment.

As illustrated in FIG. 11, DC-to-DC converter 10c according to the present embodiment includes feedback circuit 110c in control device 11c. As illustrated in FIG. 12, feedback circuit 110c includes overcurrent preventer circuit 111c in the present embodiment.

Feedback circuit 110c has terminal CS, in addition to terminals FB and OUT. A voltage corresponding to current ISW which flows through switching element 16 and is detected by current detector 12 is input to terminal CS. The voltage input to terminal CS is input to overcurrent preventer circuit 111c.

As illustrated in FIG. 12, overcurrent preventer circuit 111c includes resistors 117, 118, and 215, capacitor 116, and transistor 115.

Resistor 215 is an element for preventing an excessive current from flowing from the output terminal of error amplifier 212 when transistor 115 is turned on.

2-2. Operation

The above configuration of lighting device 1c allows an electric charge accumulated in capacitor 213 to flow to ground via a path running through resistor 215 and transistor 115 when current ISW which flows through switching element 16 exceeds threshold Ith. Accordingly, an output voltage from error amplifier 212, or in other words, an input voltage to the non-inverting input terminal of comparator 214 temporarily falls. This shortens a period in which a signal output from terminal OUT of feedback circuit 110 has a high voltage, thus shortening on period Ton of switching element 16. In this manner, if current ISW exceeds threshold Ith, on period Ton of switching element 16 is shortened. Thus, peak value ISW_p of current ISW is not excessively increased, and damage to switching element 16 is avoided.

2-3. Advantageous Effects and Others

As described above, in lighting device 1c according to the present embodiment, when a current value is greater than the threshold, control device 11c makes the on period of switching element 16 shorter than the on period for when a current value is smaller than the threshold.

In this manner, even if a voltage input to DC-to-DC converter 10c of lighting device 1c suddenly changes, an excessive current is prevented from flowing through switching element 16 included in DC-to-DC converter 10c.

Embodiment 3

The following describes a lighting device according to Embodiment 3. In the above embodiments, on period Ton of switching element 16 is shortened when current ISW which flows through switching element 16 exceeds threshold Ith, whereas in the present embodiment, a switching period is extended (i.e., switching frequency is decreased) without changing on period Ton. A lighting device according to the present embodiment differs from lighting device 1c according to Embodiment 2 described above in the configuration of the feedback circuit, and is the same as lighting device 1c in other respects, and thus the following mainly describes the configuration and operation of the feedback circuit of the lighting device according to the present embodiment.

3-1. Configuration

Described first is the configuration of the lighting device according to the present embodiment with reference to the drawings.

Figure 13:
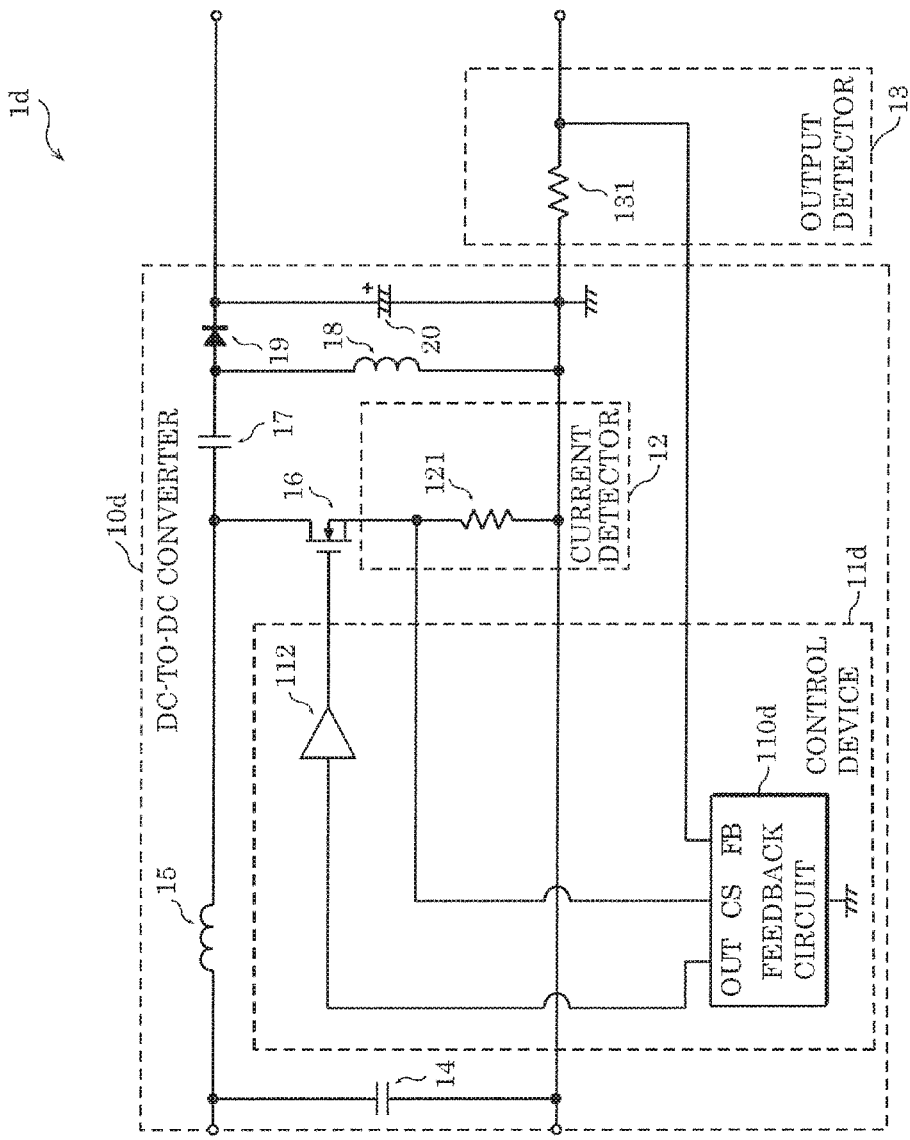
FIG. 13 is a circuit diagram illustrating a configuration of a lighting device according to Embodiment 3.

FIG. 13 is a circuit diagram illustrating a configuration of lighting device 1d according to the present embodiment.

Figure 14:
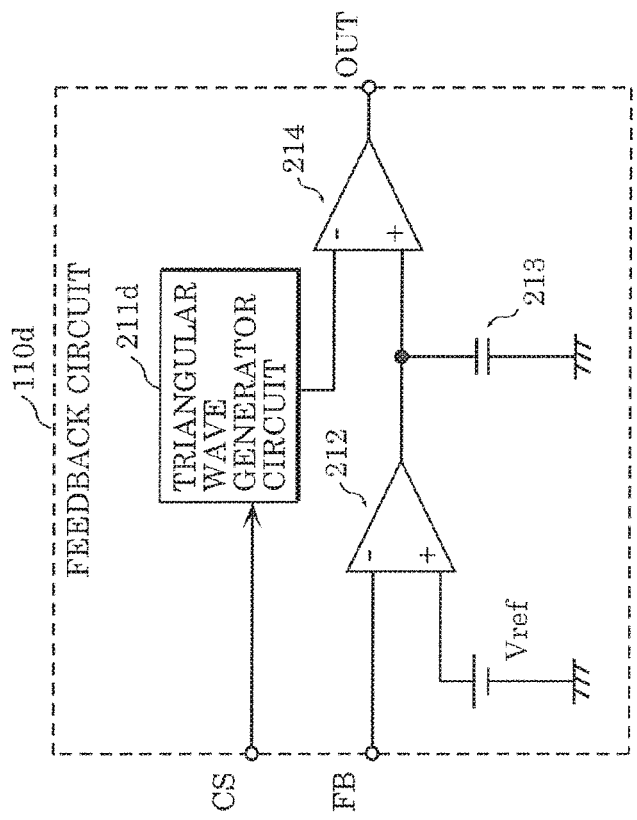
FIG. 14 is a circuit diagram illustrating a configuration of a feedback circuit according to Embodiment 3.

FIG. 14 is a circuit diagram illustrating a configuration of feedback circuit 110d according to the present embodiment.

As illustrated in FIG. 13, DC-to-DC converter 10d according to the present embodiment includes feedback circuit 110d in control device 11d.

Feedback circuit 110d does not include an overcurrent preventer circuit as illustrated in FIG. 14. Feedback circuit 110d includes triangular wave generator circuit 211d, and a signal input from terminal CS is input to triangular wave generator circuit 211d.

Triangular wave generator circuit 211d detects that current ISW which flows through switching element 16 exceeds threshold Ith, according to a signal input from terminal CS. In this case, triangular wave generator circuit 211d extends the switching period of switching element 16 by extending a cycle of an output signal. In addition, triangular wave generator circuit 211d adjusts the slope of an output signal such that on period Ton of switching element 16 for when current ISW does not exceed threshold Ith is substantially the same as on period Ton for when current ISW exceeds threshold Ith. The above configuration of triangular wave generator circuit 211d allows, when current ISW is greater than threshold Ith, feedback circuit 110c to decrease the duty cycle of switching element 16 below the duty cycle for when current ISW is less than threshold Ith. This prevents an excessive current from flowing through switching element 16.

3-2. Operation

The following describes operation of lighting device 1d according to the present embodiment with reference to the drawings.

Figure 15:
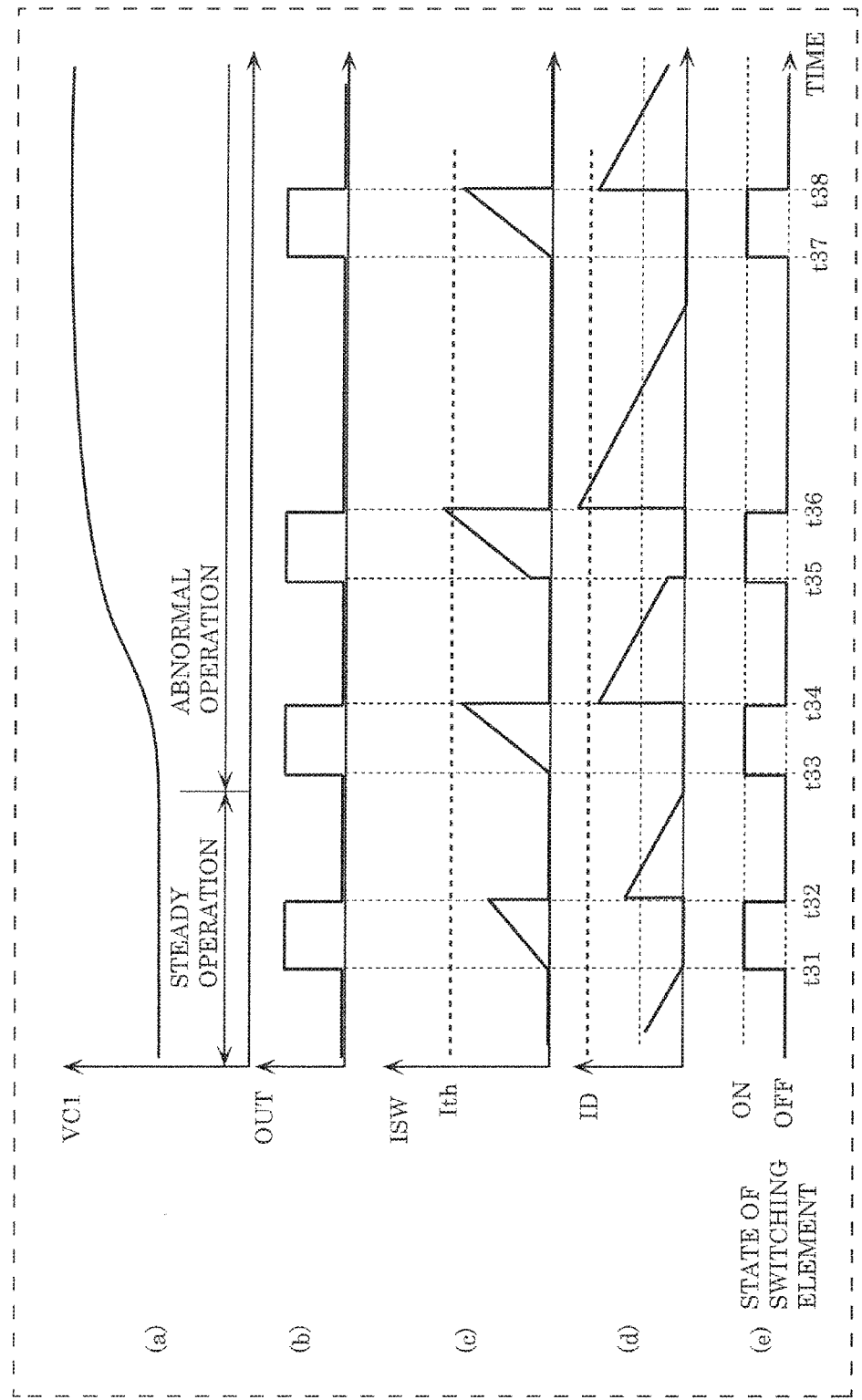
FIG. 15 is a timing chart schematically illustrating operation of the lighting device according to Embodiment 3.

FIG. 15 is a timing chart schematically illustrating operation of lighting device 1d according to the present embodiment. Graph (a) in FIG. 15 illustrates a waveform of voltage VC1 applied to capacitor 14 of lighting device 1d. Graph (b) in FIG. 15 illustrates a waveform of an output signal (OUT) from terminal OUT of feedback circuit 110d. Graph (c) in FIG. 15 illustrates a waveform of current ISW which flows through switching element 16. Graph (d) in FIG. 15 illustrates a waveform of current ID which flows through diode 19. Graph (e) in FIG. 15 illustrates a waveform indicating the state of switching element 16.

As illustrated in graph (a) in FIG. 15, the occurrence of abnormal operation in lighting device 1d abnormally increases voltage VC1, and consequently current ISW which flows through switching element 16 may exceed threshold Ith (see time t36 in FIG. 15), as with Embodiment 1 described above. In this case, a voltage corresponding to current ISW is input to terminal CS of feedback circuit 110d. The voltage input to terminal CS is input to triangular wave generator circuit 211d. If triangular wave generator circuit 211d detects, based on the input voltage, that current ISW has exceeded threshold Ith at time t36 illustrated in FIG. 15, triangular wave generator circuit 211d is configured to extend a cycle of an output signal over a predetermined period, which extends a switching period of switching element 16. Furthermore, triangular wave generator circuit 211d is configured to adjust the slope of an output signal such that on period Ton of switching element 16 for when current ISW does not exceed threshold Ith is substantially the same as on period Ton for when current ISW exceeds threshold Ith. As illustrated in graph (e) in FIG. 15, this does not change on period Ton of switching element 16 when current ISW exceeds threshold Ith, but rather extends a switching period (i.e., decreases switching frequency). Accordingly, when current ISW exceeds threshold Ith, a duty cycle is decreased below the duty cycle for when current ISW does not exceed threshold Ith, thus achieving lighting device 1d which can prevent an excessive current from flowing through switching element 16 (see graph (c) in FIG. 15). Note that a period in which triangular wave generator circuit 211d keeps outputting a signal in an extended cycle can be determined as appropriate according to the characteristics of lighting device 1d, the cycle, and others. For example, the period may be substantially equivalent to several cycles in which triangular wave generator circuit 211d outputs signals.

3-3. Advantageous Effects and Others

As described above, if a current value is greater than the threshold, control device 11d in lighting device 1d according to the present embodiment decreases a switching frequency of switching element 16 below a switching frequency for when a current value is less than the threshold.

In this manner, even if a voltage input to DC-to-DC converter 10d of lighting device 1d suddenly changes, an excessive current can be prevented from flowing through switching element 16 included in DC-to-DC converter 10d.

Embodiment 4

The following describes lighting device 1e according to Embodiment 4. In the present embodiment, when current ISW which flows through switching element 16 exceeds threshold Ith, the duty cycle of switching element 16 is made lower than the duty cycle for when current ISW does not exceed threshold Ith, as with the above embodiments. In the present embodiment, a configuration is adopted in which switching element 16 is not turned on in the subsequent on period of switching element 16 if current ISW exceeds threshold Ith. The lighting device according to the present embodiment differs from lighting device 1 according to Embodiment 1 described above in the configuration of the overcurrent preventer circuit, and is the same as lighting device 1 in other respects. Thus, the following mainly describes the configuration and operation of the overcurrent preventer circuit of the lighting device according to the present embodiment.

4-1. Configuration

Described first is the configuration of the lighting device according to the present embodiment, with reference to the drawings.

Figure 16:
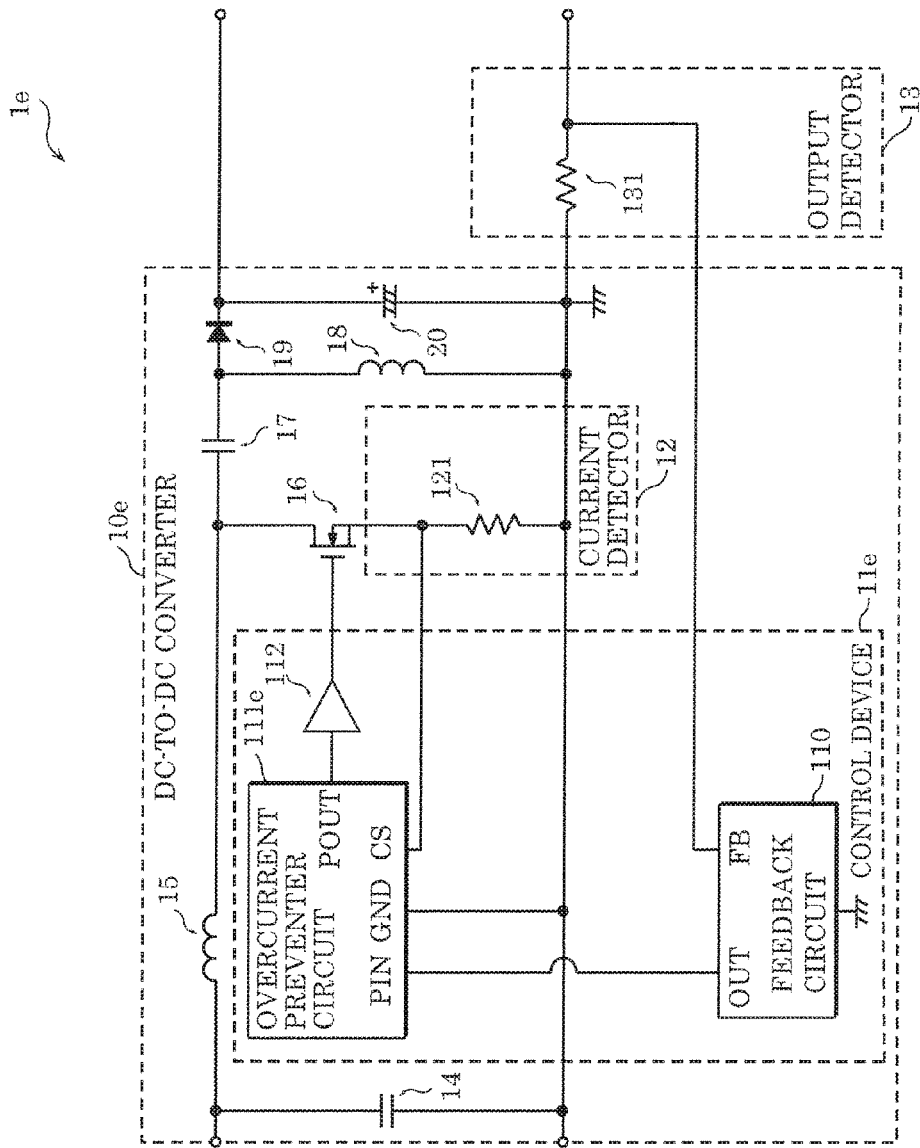
FIG. 16 is a circuit diagram illustrating a configuration of a lighting device according to Embodiment 4.

FIG. 16 is a circuit diagram illustrating a configuration of lighting device 1e according to the present embodiment.

Figure 17:
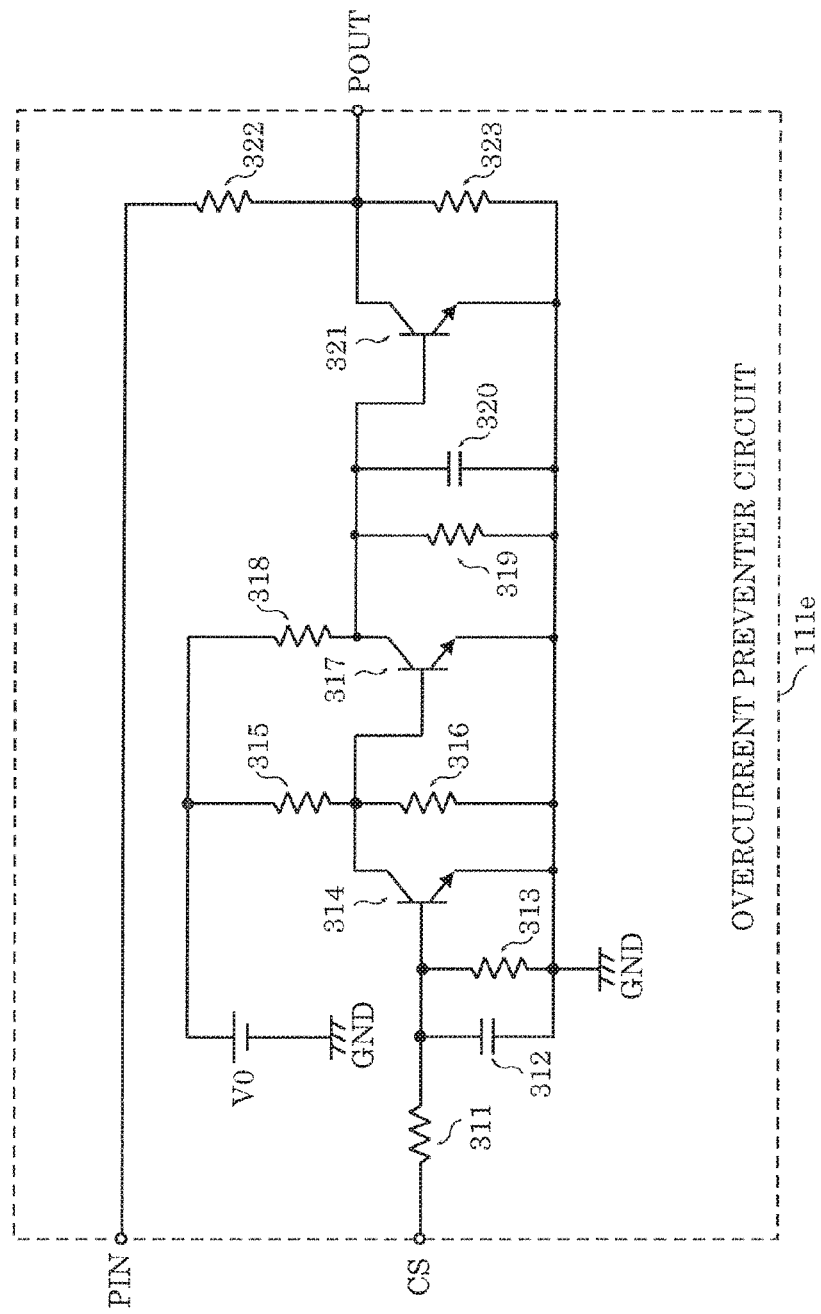
FIG. 17 is a circuit diagram illustrating a configuration of an overcurrent preventer circuit according to Embodiment 4.

FIG. 17 is a circuit diagram illustrating a configuration of overcurrent preventer circuit 111e according to the present embodiment.

As illustrated in FIG. 16, DC-to-DC converter 10e according to the present embodiment includes overcurrent preventer circuit 111e in control device 11e.

As illustrated in FIG. 17, overcurrent preventer circuit 111e includes terminals PIN, POUT, CS, and GND, resistors 311, 313, 315, 316, 318, 319, 322, and 323, capacitors 312 and 320, and transistors 314, 317, and 321.

Terminal PIN is a terminal into which a signal for turning on and off switching element 16 is input from terminal OUT of feedback circuit 110.

Terminal POUT is a terminal which outputs a signal generated by overcurrent preventer circuit 111e to drive circuit 112. The signal generated by overcurrent preventer circuit 111e is a signal for controlling switching element 16 to prevent an excessive current from flowing through switching element 16.

Terminal CS is a terminal into which a signal having a voltage corresponding to current ISW which flows through switching element 16 is input.

Terminal GND is a grounded terminal.

Resistors 311 and 313 and capacitor 312 are elements included in an RC filter. A signal from current detector 12 is input to the base electrode of transistor 314 via the RC filter.

Transistor 314 is an element controlled based on an output signal from current detector 12. In the present embodiment, transistor 314 is an npn type bipolar transistor. Transistor 314 has a base electrode connected to terminal CS via the RC filter, a collector electrode connected to the base electrode of transistor 317, and a grounded emitter electrode. Transistor 314 is turned on when current ISW which flows through switching element 16 exceeds threshold Ith.

Resistors 315 and 316 are elements for dividing voltage V0. Note that voltage V0 is a constant voltage for applying a voltage to, for instance, the gate electrode of transistor 321. Resistor 315 has a terminal to which voltage V0 is applied, and another terminal connected to one terminal of resistor 316 and the collector electrode of transistor 314. The other terminal of resistor 316 is grounded. The junction between resistors 315 and 316 is connected to the base electrode of transistor 317. In this manner, when transistor 314 is in the off state, a voltage obtained by resistors 315 and 316 dividing voltage V0 is applied to the base electrode of transistor 317.

Transistor 317 is an element which is turned on and off according to the state of transistor 314. In the present embodiment, transistor 317 is an npn type bipolar transistor. Transistor 317 has a base electrode connected to the collector electrode of transistor 314 and the junction between resistors 315 and 316, a collector electrode connected to the base electrode of transistor 321, and a grounded emitter electrode. Transistor 317 is turned on when transistor 314 is in the off state, or in other words, current ISW which flows through switching element 16 does not exceed threshold Ith, and is turned off when current ISW exceeds threshold Ith.

Resistors 318 and 319 are elements for dividing voltage V0. Resistor 318 has a terminal to which voltage V0 is applied, and another terminal connected to one terminal of resistor 319 and the collector electrode of transistor 317. The other terminal of resistor 319 is grounded. The junction between resistors 318 and 319 is connected to one terminal of capacitor 320 and the base electrode of transistor 321. Accordingly, a voltage obtained by resistors 315 and 316 dividing voltage V0 is applied to the base electrode of transistor 317, when transistor 314 is in the off state.

Capacitor 320 is an element included in an RC filter with resistors 318 and 319. Capacitor 320 has a terminal connected to the junction between resistors 318 and 319, and another grounded terminal.

Transistor 321 is an element which is turned on and off according to the state of transistor 317. In the present embodiment, transistor 321 is an npn type bipolar transistor. Transistor 321 has a base electrode connected to the collector electrode of transistor 317, the junction between resistors 318 and 319, and one terminal of capacitor 320, a collector electrode connected to terminal POUT, and a grounded emitter electrode. Transistor 321 is turned on when transistor 317 is in the off state, or in other words, when current ISW which flows through switching element 16 exceeds threshold Ith, and is turned off when current ISW does not exceed threshold Ith.

Resistors 322 and 323 are elements for dividing a voltage input from terminal PIN, and outputting the divided voltage to terminal POUT. Resistor 322 has a terminal connected to terminal PIN, and another terminal connected to one terminal of resistor 323. The other terminal of resistor 323 is grounded. The junction between resistors 322 and 323 is connected to the collector electrode of transistor 321 and terminal POUT. Resistor 322 also functions as an element for preventing an excessive current from flowing from terminal OUT of feedback circuit 110, when transistor 321 is turned on.

4-2. Operation

The following describes operation of lighting device 1e according to the present embodiment with reference to the drawings.

Figure 18:
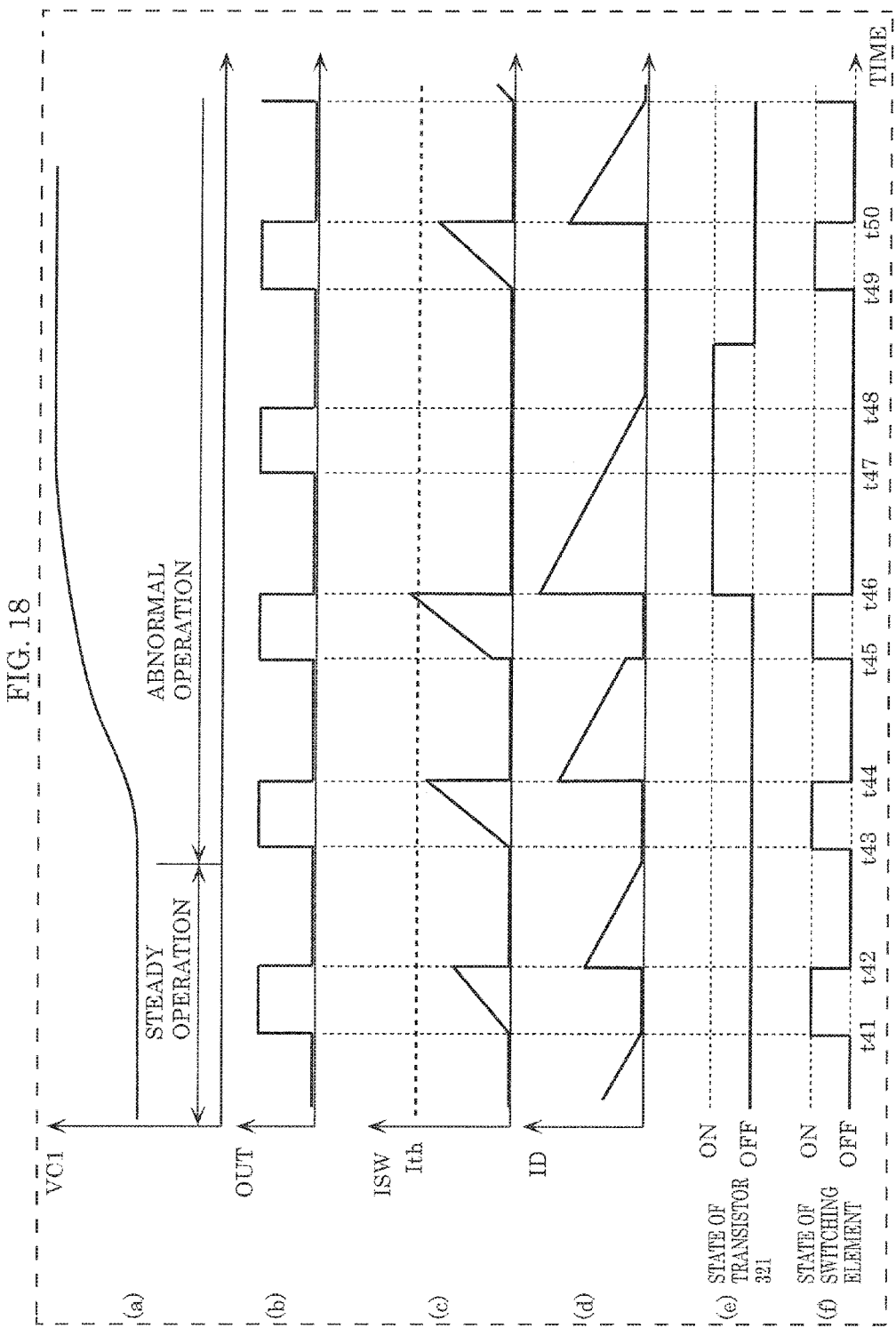
FIG. 18 is a timing chart which schematically illustrates operation of the lighting device according to Embodiment 4.

FIG. 18 is a timing chart schematically illustrating operation of lighting device 1e according to the present embodiment. Graph (a) in FIG. 18 illustrates a waveform of voltage VC1 applied to capacitor 14 of lighting device 1e. Graph (b) in FIG. 18 illustrates a waveform of an output signal (OUT) from terminal OUT of feedback circuit 110. Graph (c) in FIG. 18 illustrates a waveform of current ISW which flows through switching element 16. Graph (d) in FIG. 18 illustrates a waveform of current ID which flows through diode 19. Graph (e) in FIG. 18 illustrates a waveform indicating the state of transistor 321. Graph (f in FIG. 18 illustrates a waveform indicating the state of switching element 16.

As illustrated in graph (a) in FIG. 18, there are cases where lighting device 1e is in a steady operation state, and where lighting device 1e is in an abnormal operation state and voltage VC1 increases abnormally (see time t43 in FIG. 18 and thereafter), as with Embodiment 1 described above.

In either case, a voltage corresponding to current ISW is input to terminal CS of overcurrent preventer circuit 111e. The voltage input to terminal CS is input to transistor 314 via the RC filter which includes resistors 311 and 313, and capacitor 312.

In the steady operation state, current ISW does not exceed threshold Ith, transistors 314 and 321 are maintained in the off state, and transistor 317 is maintained in the on state. Accordingly, a voltage of a signal input from terminal PIN is divided by resistors 322 and 323, and output to POUT. Thus, switching element 16 is controlled based on a signal output from terminal OUT of feedback circuit 110.

When abnormal operation occurs, and current ISW exceeds threshold Ith, transistor 314 is turned on after a time according to a time constant of the RC filter. Accordingly, the base electrode of transistor 317 is grounded, and thus transistor 317 is turned off. In this manner, a voltage obtained by resistors 318 and 319 dividing voltage V0 is applied to the base electrode of transistor 321. The resultant divided voltage is set to a voltage greater than or equal to a threshold voltage for placing transistor 321 in the on state. Accordingly, transistor 321 is turned on after a time according to a time constant of the RC filter which includes, for instance, capacitor 320. Accordingly, terminal POUT is grounded, and thus an input voltage to drive circuit 112 reaches zero. In this manner, switching element 16 is turned off.

Switching element 16 is turned off, and consequently the voltage of a signal input to terminal CS falls to zero. In contrast to the case where current ISW exceeds threshold Ith, transistor 314 is turned off and transistor 317 is turned on after a time period according to the time constant of the RC filter which includes, for instance, capacitor 312, in this case. Transistor 321 is turned off after a time period according to the time constant of the RC filter which includes, for instance, capacitor 320 since transistor 317 is turned on. Accordingly, switching element 16 is maintained in the off state during a predetermined time period according to the time constants of the RC filters included in overcurrent preventer circuit 111e from when switching element 16 is turned off due to current ISW exceeding threshold Ith. In the present embodiment, RC filters with which the predetermined time period is greater than or equal to a switching period are used. Thus, in lighting device 1e according to the present embodiment, switching element 16 is not turned on at least during a switching period of switching element 16 when current ISW exceeds threshold Ith. Accordingly, if current ISW exceeds threshold Ith, switching element 16 is not turned on in the subsequent on period. Accordingly, the duty cycle of switching element 16 is lowered, and thus an excessive current is prevented from flowing through switching element 16.

4-3. Advantageous Effects and Others

As described above, control device 11e does not turn on switching element 16 during the switching period of switching element 16 if a current value exceeds the threshold, in lighting device 1e according to the present embodiment.

Accordingly, even if a voltage input to DC-to-DC converter 10e of lighting device 1e suddenly changes, an excessive current is prevented from flowing through switching element 16 included in DC-to-DC converter 10e.

Embodiment 5

Figure 19:
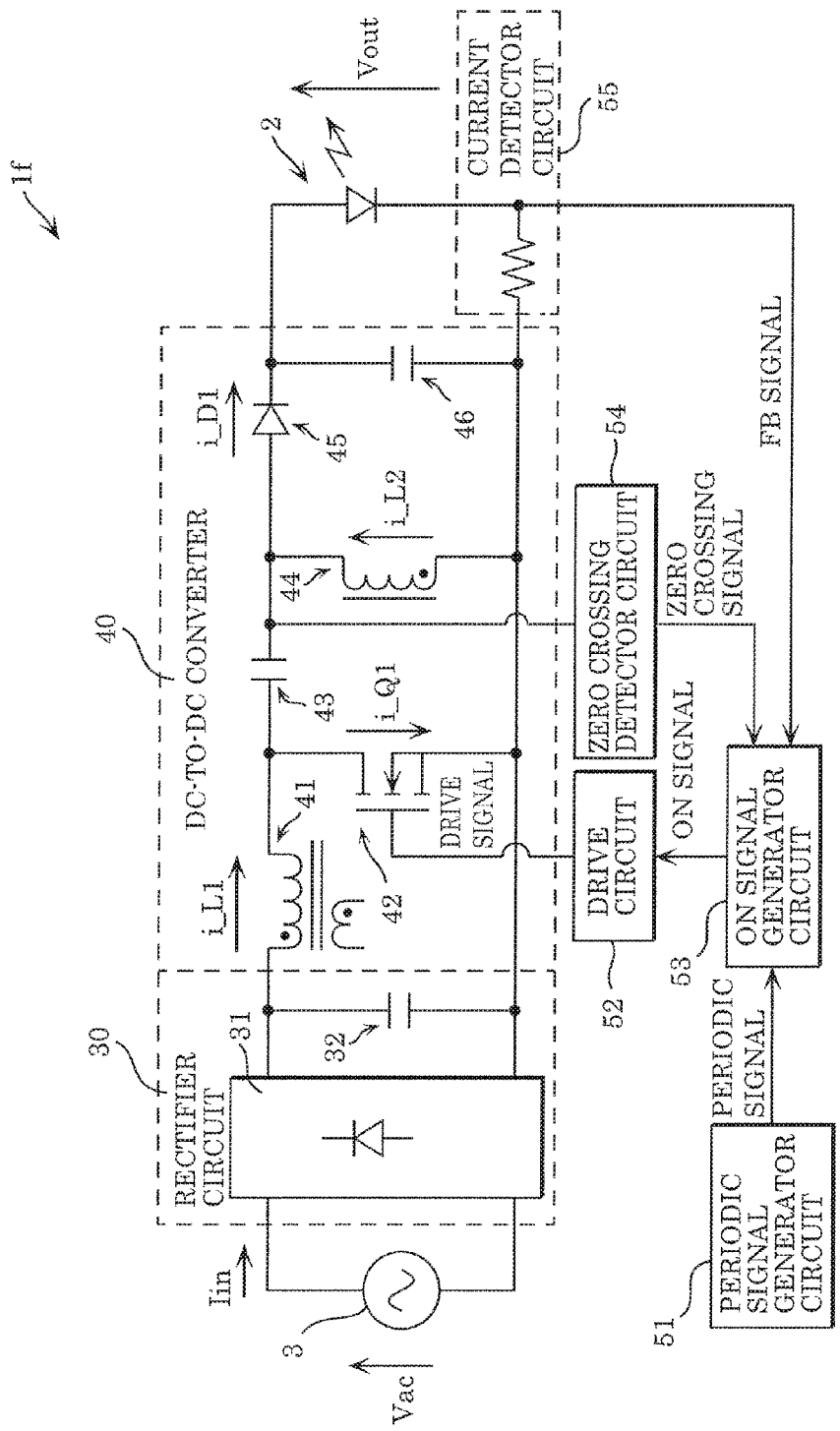
FIG. 19 is a circuit diagram illustrating a lighting device according to Embodiment 5.

FIG. 19 is a circuit diagram illustrating lighting device 1f according to Embodiment 5. Lighting device 1f is a constant current circuit which is connected to AC power supply 3 and supplies a current to solid-state light emitting element 2. Lighting device 1f includes rectifier circuit 30, DC-to-DC converter 40, periodic signal generator circuit 51, drive circuit 52, on signal generator circuit 53, zero crossing detector circuit 54, and current detector circuit 55.

AC power supply 3 is a power supply which supplies AC power to lighting device 1f, and is a commercial AC power supply, for example.

Solid-state light emitting element 2 is an element which emits light in response to a current supplied from lighting device 1f, and is a light emitting diode (LED) or organic electro-luminescent (EL) element, for example.

Rectifier circuit 30 rectifies AC power from AC power supply 3 and, in the present embodiment, includes diode bridge 31 for rectification, and capacitor 32 for smoothing.

DC-to-DC converter 40 is a circuit which increases or decreases a direct voltage from rectifier circuit 30, and converts the resultant voltage into a direct voltage applied to solid-state light emitting element 2. In the present embodiment, DC-to-DC converter 40 is a SEPIC DC-to-DC converter, and includes inductors 41 and 44, switching element 42, capacitors 43 and 46, and diode 45. Inductors 41 and 44 form a primary winding and a secondary winding of a transformer, respectively. Capacitor 43 is a coupling capacitor which connects two inductors 41 and 44 in series. Switching element 42 chops a direct current from rectifier circuit 30 by repeating on and off, and is an N-channel metal oxide semiconductor (NMOS) field-effect transistor (FET) in the present embodiment. Diode 45 is a rectifier element which rectifies AC as a result of chopping by switching element 42 into a direct current. Capacitor 46 is a smoothing capacitor which smoothes a pulsating current (and an undulating voltage) as a result of rectification by diode 45, to a direct current (and a direct voltage) to be applied to solid-state light emitting element 2. A basic operation of DC-to-DC converter 40 having such a configuration is to chop a direct current from rectifier circuit 30 by repetition of on and off of switching element 42, and thereafter rectify the resultant current in diode 45.

Periodic signal generator circuit 51 generates a periodic signal indicating arrival of a fixed period, and outputs the periodic signal to on signal generator circuit 53. For example, periodic signal generator circuit 51 includes a clock generator and a frequency divider, and outputs a pulse which rises in each fixed period as a periodic signal. Here, a fixed period is a predetermined period (switching period) to cause a current which flows through diode 45 to reliably reach zero within one cyclic period when a power supply voltage is stable (a change in alternating voltage supplied from AC power supply 3 is within a certain range). In other words, a fixed period is determined such that DC-to-DC converter 40 operates in a discontinuous current mode (DCM) or a boundary current mode (BCM) when a power supply voltage is stable.

Zero crossing detector circuit 54 detects that a current which flows through diode 45 has reached zero (zero crossing) in the off period of switching element 42, and outputs a signal (zero crossing signal) indicating a time at which a value has crossed zero to on signal generator circuit 53. In the present embodiment, zero crossing detector circuit 54 includes, for instance, a comparator which detects a voltage across inductor 44 (detects that a voltage at the junction between inductor 44 and diode 45 has changed from a positive voltage to zero, for example).

Current detector circuit 55 detects an output current from lighting device 1f, or in other words, a current which flows through solid-state light emitting element 2, and outputs the detected current to on signal generator circuit 53 as a feedback (FB) signal. In the present embodiment, current detector circuit 55 includes a resistor connected to solid-state light emitting element 2 in series.

On signal generator circuit 53 generates an on signal which indicates an on period of switching element 42, and outputs the generated on signal to drive circuit 52. On signal generator circuit 53 includes, for example, a non-volatile memory in which a program is stored, a processor which executes the program in order to carry out the functions described herein, a volatile memory, and an A/D converter, for instance. On signal generator circuit 53 generates an on signal which basically causes an on period to start in the fixed period indicated by a periodic signal output from periodic signal generator circuit 51 and to last for a period in which an average of a current detected by current detector circuit 55 reaches a target current value. Here, an average of a current is, for example, an average of a current in a predetermined number of cycles indicated by a periodic signal output from periodic signal generator circuit 51. A target current value is a predetermined current value as an output current from lighting device 1f or a current value determined by a dimming indication given from the outside.

On signal generator circuit 53 further performs the following control as distinctive control during the off period of switching element 42. In other words, if zero crossing detector circuit 54 has not detected zero crossing at a moment when the periodic signal from periodic signal generator circuit 51 indicates arrival of a fixed period, on signal generator circuit 53 waits at least until zero crossing is detected, and thereafter generates an on signal. This is for preventing switching element 42 from being turned on before zero crossing is detected, when a power supply voltage from AC power supply 3 suddenly changes. In other words, this is for preventing DC-to-DC converter 40 from operating in a continuous current mode (CCM) when a power supply voltage from AC power supply 3 suddenly changes.

More specifically, in the present embodiment, on signal generator circuit 53 performs the following control during the off period of switching element 42. In other words, if zero crossing detector circuit 54 has not detected zero crossing at a moment when a periodic signal indicates arrival of a fixed period, on signal generator circuit 53 generates an on signal at least after zero crossing is detected and at a moment when a periodic signal indicates arrival of a fixed period. In short, on signal generator circuit 53 skips generating an on signal until zero crossing is detected.

Drive circuit 52 generates a control signal for turning on switching element 42 (i.e., a driving signal) in accordance with the time indicated by the on signal generated from on signal generator circuit 53 and outputs the control signal to switching element 42. Drive circuit 52 is a buffer amplifier, for example.

The following describes operation of lighting device 1f according to the present embodiment having the configuration as described above. Here, when a power supply voltage is stable (a state where a change in alternating voltage supplied by AC power supply 3 is within a fixed range) and when a power supply voltage suddenly changes (when a change in alternating voltage supplied by AC power supply 3 is beyond the fixed range) are separately described.

(1) When Power Supply Voltage is Stable

When a power supply voltage is stable, lighting device 1f performs steady operation. In other words, on signal generator circuit 53 performs feedback control based on a FB signal from current detector circuit 55, so that the on time of switching element 42 is substantially the same independently of the phase of an alternating voltage from AC power supply 3. As a result, the duty cycle of switching element 42 is substantially the same.

Figure 20:
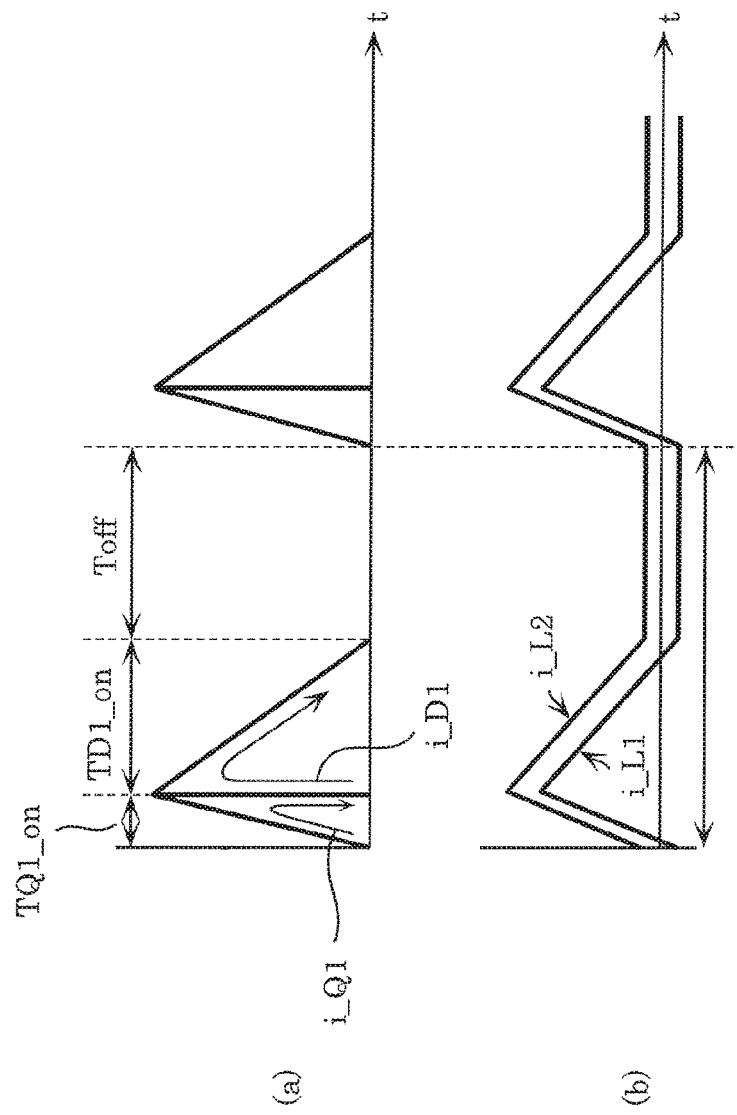
FIG. 20 is a timing diagram illustrating steady operation of the lighting device according to Embodiment 5.

FIG. 20 is a timing diagram illustrating the steady operation of lighting device 1f. In FIG. 20, (a) illustrates a waveform of current i_Q1 which flows through switching element 42 and a waveform of current i_D1 which flows through diode 45, and (b) illustrates a waveform of current i_L1 which flows through inductor 41 and a waveform of current i_L2 which flows through inductor 44. The following describes steady operation of lighting device 1f when a power supply voltage is stable, for each of the three periods illustrated in FIG. 20 (i.e., TQ1_on, TD1_on, Toff).

(1-1) On Period of Switching Element 42 (TQ1_on)

When switching element 42 is on, a current flowing through inductor 41, and a current flowing through capacitor 43 from inductor 44 flow into switching element 42. At this time, diode 45 is reversely biased and turned off. In the present embodiment, DC-to-DC converter 40 is a SEPIC DC-to-DC converter. According to a SEPIC DC-to-DC converter, a voltage across capacitor 32 during steady operation and a voltage across capacitor 43 are each substantially the same as an input voltage (i.e., an output voltage from rectifier circuit 30), as a feature of circuit operation. In other words, capacitor 32, capacitor 43, inductor 41, and inductor 44 are in an equivalent state to the state where capacitor 32, capacitor 43, inductor 41, and inductor 44 are all connected in parallel.

A current flowing through switching element 42 is a sum total of a current flowing through inductor 41 and a current flowing through inductor 44. Accordingly, rate of change ΔiQ1on of a current flowing through switching element 42 is a sum total of rate of change ΔiL1_Q1on of a current flowing through inductor 41 and rate of change ΔiL2_Q1on of a current flowing through inductor 44, as shown by Expression 2 below.

$$\Delta iL1\_Q1\text{on}=V\text{ac}/L1, \Delta iL2\_Q1\text{on}=V\text{ac}/L2$$

$$\Delta iQ1\text{on}=V\text{ac}/L, L=(L1\times L2)/(L1+L2) \quad \text{(Expression 2)}$$

Here, Vac denotes an alternating voltage from AC power supply 3, L1 denotes an inductance of inductor 41, L2 denotes an inductance of inductor 44, and L is a synthetic inductance of inductors 41 and 44.

Accordingly, peak current ipeak_Q1 of switching element 42 after on period TQ1_on has elapsed is a value shown by Expression 3 below.

$$i\text{peak\_}Q1=V\text{ac}/L\times TQ1\_\text{on} \quad \text{(Expression 3)}$$

(1-2) On Period of Diode 45 (TD1_on)

If switching element 42 is turned off, diode 45 is forward biased and turned on, and a current flowing through inductor 41 and a current flowing through inductor 44 pass through diode 45, and flow into capacitor 46 and solid-state light emitting element 2. Since a voltage across capacitor 32 during steady operation and a voltage across capacitor 43 are each substantially the same as an input voltage, a voltage substantially the same as output voltage Vout is applied to inductors 41 and 44 in an opposite direction to the direction when switching element 42 is on.

Rate of change ΔiD1on of a current which flows through diode 45 is a sum total of rate of change ΔiL1_D1on of a current which flows through inductor 41 and rate of change ΔiL2_D1on of a current which flows through inductor 44, as shown by Expression 4 below.

$$\Delta iL1\_D1\text{on}=V\text{out}/L1, \Delta iL2\_D1\text{on}=V\text{out}/L2$$

$$\Delta iD1\text{on}=V\text{out}/L \quad \text{(Expression 4)}$$

Here, peak value ipeak_D1 of a current which flows through diode 45 is shown by Expression 5 below, and equal to peak value ipeak_Q1 of a current which flows through switching element 42.

$$i\text{peak\_}D1=V\text{out}/L\times TD1\_\text{on}=i\text{peak\_}Q1 \quad \text{(Expression 5)}$$

Accordingly, an on period (TD1_on) of diode 45 has a value indicated by Expression 6, based on Expressions 3 and 5 shown above.

$$TD1\_\text{on}=TQ1\_\text{on}\times V\text{ac}/V\text{out} \quad \text{(Expression 6)}$$

(1-3) Off Period of Diode 45 (Toff)

Energy stored in inductor 41 and energy stored in inductor 44 show no change in period Toff until switching element 42 is turned on next after a current which flows through diode 45 (i.e., a sum total of a current flowing through inductor 41 and a current flowing through inductor 44) has reached zero. Thus, inductors 41 and 44 keep passing a current flowing at a moment when diode 45 is turned off (current which flows through diode 45 has reached zero).

Input current I_in to lighting device 1f is a current obtained by capacitor 32 smoothing current i_L1 which flows through inductor 41 and is equal to an average of current i_L1 in each switching period, as shown by Expression 7.

$$I\_\text{in}=TQ1\_\text{on}/2L\times\text{OnDuty}\times V\text{ac}$$

$$V\text{ac}=\sqrt{2}\times V\text{ac\_rms}\times\text{Sin}(2\pi fT)$$

$$\text{OnDuty}=V\text{out}/(V\text{out}+\sqrt{2}V\text{ac\_rms}) \quad \text{(Expression 7)}$$

Here, Vac_rms denotes an effective value of alternating voltage Vac of AC power supply 3, and f denotes a frequency of alternating voltage Vac.

Note that an output current from lighting device 1f is a current obtained by capacitor 46 smoothing current i_D1 which flows through diode 45 during period TD1_on when diode 45 is on, and is equal to an average of current i_D1.

An output current is supplied to solid-state light emitting element 2, using energy released from inductors 41 and 44 during on period TD1_on of diode 45. Similarly, energy accumulated in inductors 41 and 44 during on period TQ1_on of switching element 42 is energy drawn from AC power supply 3. Specifically, input current I_in can be considered as a change in current in inductors 41 and 44 during on period TQ1_on of switching element 42, or in other words, an average of a current which flows through switching element 42.

Figure 21:
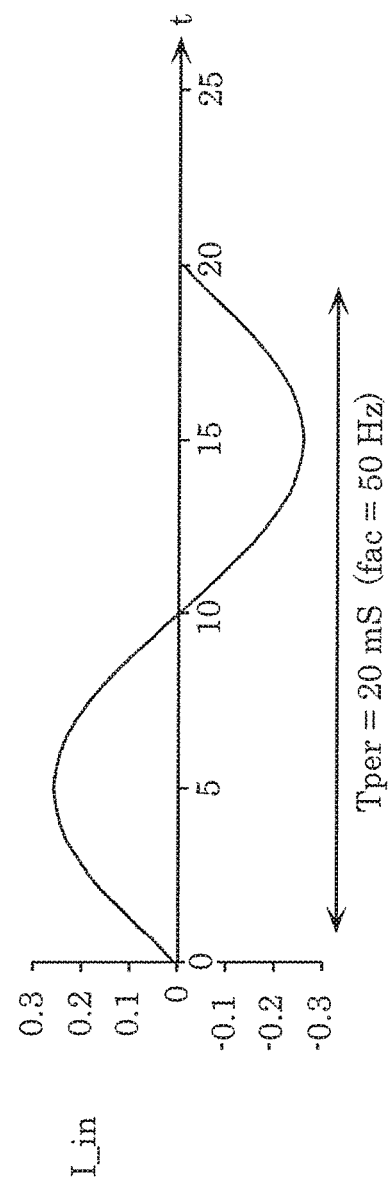
FIG. 21 illustrates an example of a waveform of a current input to the lighting device according to Embodiment 5.

As shown above by Expression 7, input current I_in to lighting device 1f shows the same sine waveform as the input alternating voltage, as with a typical boost converter. FIG. 21 illustrates an example of a waveform of input current I_in to lighting device 1f. As described above, lighting device 1f according to the present embodiment includes SEPIC DC-to-DC converter 40, and achieves a high power factor and a reduction in high frequency distortion, independently of a difference between an input voltage and an output voltage.

Note that with regard to a cycle of turning on switching element 42 (switching period), periodic signal generator circuit 51 is designed such that DC-to-DC converter 40 operates in BCM or DCM during steady operation. Typically, operation modes for a current in the DC-to-DC converter include the continuous current mode (CCM), the discontinuous current mode (DCM), and the boundary current mode (BCM). The continuous current mode (CCM) is an operation mode for turning switching element 42 on before a current which flows through diode 45 reaches zero. The discontinuous current mode (DCM) is an operation mode for turning switching element 42 on after a current which flows through diode 45 reaches zero. The boundary current mode (BCM) is an operation mode for turning switching element 42 on at a time when a current which flows through diode 45 has reached substantially zero.

If the DC-to-DC converter operates in the discontinuous current mode (DCM), input current I_in increases, and a sine waveform is not achieved. Accordingly, a circuit of DC-to-DC converter 40 is designed such that DC-to-DC converter 40 operates in the discontinuous current mode (DCM) or the continuous current mode (CCM) at the peak point of an input voltage from AC power supply 3. Specifically, fixed period Tper indicated by a periodic signal generated by periodic signal generator circuit 51 is determined to satisfy the conditions indicated by Expression 8 below.

$$Tper \geq 4 \times (Pout \times L/\eta)/(OnDuty \times \sqrt{2} \times Vac\_rms)^2 \quad \text{(Expression 8)}$$

Here, Pout denotes output power from lighting device 1f, and $\eta$ denotes circuit efficiency of lighting device 1f.

In the present embodiment, switching element 42 is turned on in each fixed period Tper, which achieves a high power factor and a reduction in high frequency distortion, independently of a difference between an input voltage and an output voltage.

As described above, switching element 42 is turned on in each fixed period according to a fixed duty cycle during steady operation. A timing at which switching element 42 is turned on is after a current which flows through diode 45 reaches zero, or in other words, when a current which flows through diode 45 is substantially zero. Thus, once switching element 42 is turned on, a current which flows through switching element 42 increases from zero.

(2) When Power Supply Voltage Suddenly Changes

When a power supply voltage suddenly changes, LC resonance may occur in inductors and capacitors included in lighting device 1f, and great current oscillation may occur in diode 45. For example, when an input filter for eliminating noise is provided at an input stage of the lighting device, and if an inductor is used in the input filter, an output voltage from the rectifier circuit may increase to a voltage about twice the alternating voltage from the AC power supply.

At that time, in the conventional lighting device, once a switching element is turned on, a current greater than a current that flows during steady operation flows in, and greater energy is stored in inductors (corresponding to inductors 41 and 44 in the present embodiment). Accordingly, even if a certain period of time elapses after the switching element is turned off, a current which flows through a diode (corresponding to diode 45 in the present embodiment) does not finish flowing. As a result, a current flowing through the diode flows into the switching element next time the switching element is turned on. At that time, the inductors are saturated, which causes a still higher current to flow inside the lighting device.

Figure 22:
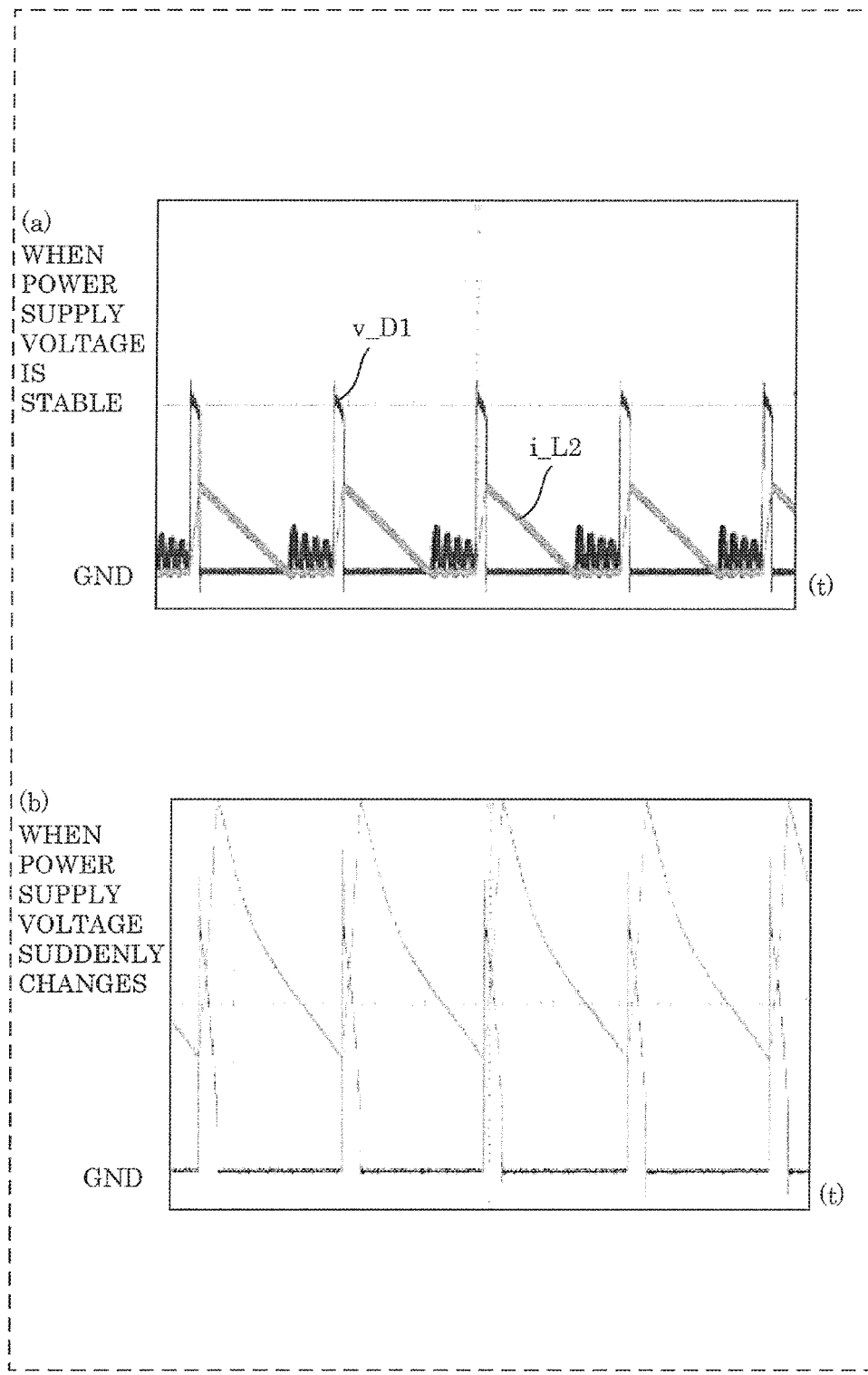
FIG. 22 is a timing diagram illustrating operation of a conventional lighting device.

FIG. 22 is a timing diagram illustrating operation of a conventional lighting device. Here, FIG. 22 illustrates waveforms of a reverse bias voltage (v_D1) applied to a diode included in the conventional lighting device and a current (i_L2) which flows through an inductor included in the conventional lighting device. In FIG. 22, (a) illustrates a waveform when a power supply voltage is stable (i.e., during steady operation), and (b) illustrates a waveform when a power supply voltage suddenly changes.

As is clear from (b) in FIG. 22, in the conventional lighting device, when a power supply voltage suddenly changes, a switching element is turned on in each fixed period before a current which flows through a diode falls to zero, and the DC-to-DC converter operates in the continuous current mode (CCM). As a result, a current flowing through the diode sequentially flows into the switching element, and a current flowing into the switching element increases. Consequently, great stress is applied to the switching element, and the switching element may be broken.

In view of this, on signal generator circuit 53 in lighting device 1f according to the present embodiment performs the following control during the off period of switching element 42. In other words, if zero crossing detector circuit 54 has not detected zero crossing at a moment when a periodic signal from periodic signal generator circuit 51 indicates arrival of a fixed period, on signal generator circuit 53 waits at least until zero crossing is detected, and generates an on signal. In this manner, switching element 42 is prevented from being turned on before zero crossing is detected, even when a power supply voltage of AC power supply 3 suddenly changes. In other words, when a power supply voltage of AC power supply 3 suddenly changes, DC-to-DC converter 40 is prevented from operating in the continuous current mode (CCM).

Figure 23:
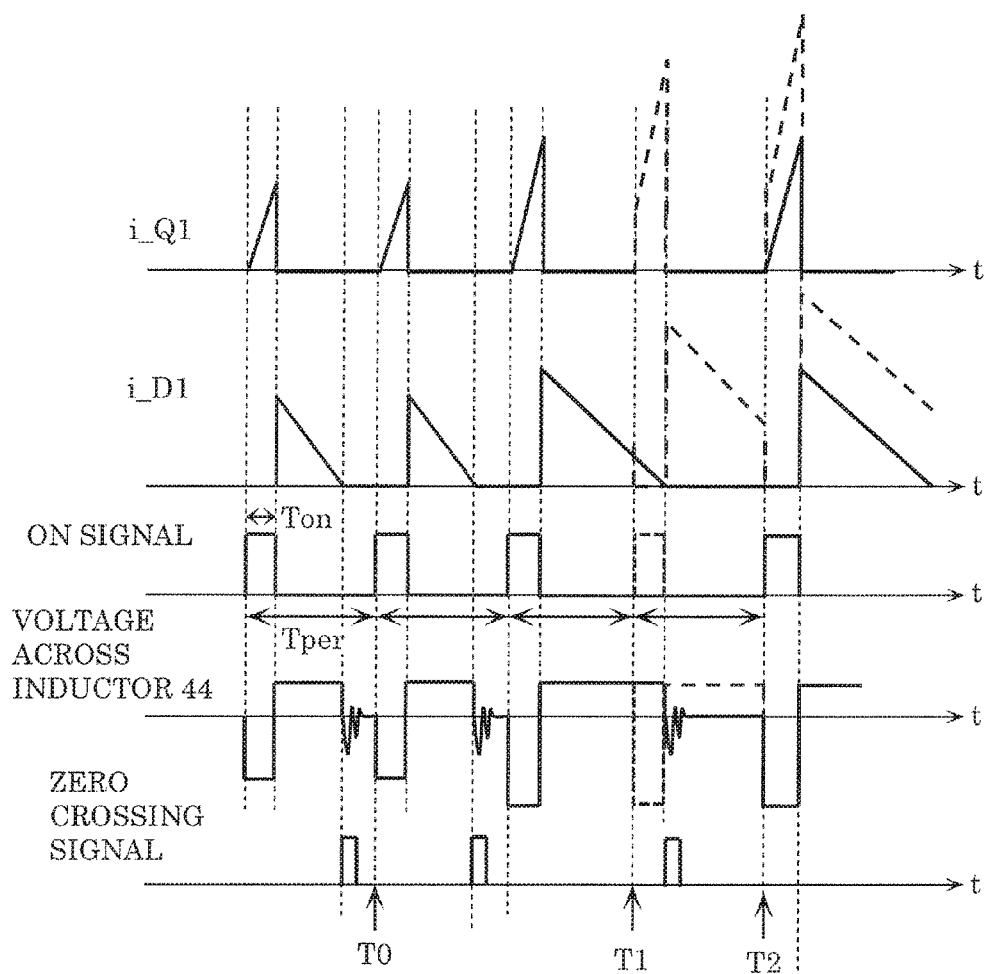
FIG. 23 is a timing diagram illustrating operation of the lighting device according to Embodiment 5.

FIG. 23 is a timing diagram illustrating operation of lighting device 1f according to the present embodiment. Here, FIG. 23 illustrates waveforms of current i_Q1 which flows through switching element 42, current i_D1 which flows through diode 45, an on signal output from on signal generator circuit 53, a voltage across inductor 44, and a zero crossing signal output from zero crossing detector circuit 54. Note that strictly, a voltage across inductor 44 is a potential at the junction between inductor 44 and diode 45, relative to a reference potential of a direct voltage output by rectifier circuit 30.

The solid lines in FIG. 23 indicate operation of lighting device 1f according to the present embodiment and the dashed lines indicate operation of the conventional lighting device stated above (lighting device which does not include distinctive on signal generator circuit 53 according to the present embodiment) when a power supply voltage suddenly changes.

When a power supply voltage is stable (a period until the second zero crossing signal (pulse) is generated from the beginning in FIG. 23), on signal generator circuit 53 generates an on signal in each fixed period Tper in accordance with a periodic signal from periodic signal generator circuit 51. The on signal is input to drive circuit 52, and supplied to the control terminal of switching element 42 as a driving signal, and switching element 42 is turned on. Furthermore, on period Ton of an on signal is controlled by on signal generator circuit 53 such that an average of a current detected by current detector circuit 55 reaches a target current value. Yet, when a power supply voltage is stable, alternating voltage Vac is substantially constant, and thus on period Ton is substantially the same. Accordingly, a peak value of current i_D1 which flows through diode 45 is substantially the same, and zero crossing detector circuit 54 detects zero crossing (see "zero crossing signal") before an on signal is generated next in each switching period.

As a result, current i_D1 which flows through diode 45 has already reached substantially zero at a time to turn on switching element 42 (at time T0, for example). Accordingly, when a power supply voltage is stable, DC-to-DC converter 40 operates in the boundary current mode (BCM) or the discontinuous current mode (DCM).

When a power supply voltage suddenly changes (a period after the second zero crossing signal (pulse) is generated in FIG. 23), an output voltage of rectifier circuit 30 increases. Along with this increase, the peak value of current i_Q1 which flows through switching element 42 and the peak value of current i_D1 which flows through diode 45 increase, as illustrated in FIG. 23.

In such a state, a conventional lighting device generates an on signal in each fixed period Tper (time T1) as shown by the dashed lines in FIG. 23, and thus the DC-to-DC converter operates in the continuous current mode (CCM). In other words, current i_Q1 begins to flow into the switching element before current i_D1 which flows through a diode reaches zero. As a result, each time an on signal is generated, peak values of current i_Q1 which flows through switching element 42 and current i_D1 which flows through diode 45 continuously increase, which may damage the switching element.

In contrast, according to lighting device 1f according to the present embodiment, if zero crossing is not detected by zero crossing detector circuit 54 at a moment when a periodic signal from periodic signal generator circuit 51 indicates arrival of a fixed period, an on signal is not generated (time T1). In the present embodiment, on signal generator circuit 53 skips generation of an on signal for one period. In other words, on signal generator circuit 53 generates an on signal after zero crossing is detected (after the third zero crossing signal is generated) and at a moment when a periodic signal from periodic signal generator circuit 51 indicates arrival of a fixed period (time T2).

Accordingly, as is clear from waveforms (solid lines) of current i_Q1 which flows through switching element 42 and current i_D1 which flows through diode 45 in FIG. 23, switching element 42 is prevented from being turned on before zero crossing is detected even if a power supply voltage suddenly changes. In other words, even if a power supply voltage suddenly changes, DC-to-DC converter 40 is prevented from operating in the continuous current mode (CCM), and thus switching element 42 is prevented from being broken.

As described above, lighting device 1f according to the present embodiment is a device which is connected to AC power supply 3 and supplies a current to solid-state light emitting element 2. Lighting device 1f includes rectifier circuit 30, DC-to-DC converter 40, periodic signal generator circuit 51, zero crossing detector circuit 54, on signal generator circuit 53, and drive circuit 52. Rectifier circuit 30 rectifies AC power from AC power supply 3. DC-to-DC converter 40 includes switching element 42 and diode 45, and chops a direct current from rectifier circuit 30 by repetition of on and off of switching element 42, and thereafter diode 45 rectifies a current obtained by chopping the direct current. Periodic signal generator circuit 51 generates a periodic signal which indicates arrival of a fixed period. Zero crossing detector circuit 54 detects that a current which flows through diode 45 has reached zero in the off period of switching element 42. If zero crossing detector circuit 54 has detected that a current has reached zero at a moment when a periodic signal indicates arrival of a fixed period in the off period of switching element 42, on signal generator circuit 53 generates an on signal which indicates a time to turn on switching element 42. Drive circuit 52 turns on switching element 42 in accordance with the time indicated by an on signal generated by on signal generator circuit 53. At this time, on signal generator circuit 53 performs the following control during the off period of switching element 42. In other words, if zero crossing detector circuit 54 has not detected that a current has reached zero at a moment when a periodic signal indicates arrival of a fixed period, on signal generator circuit 53 waits at least until zero crossing is detected and generates an on signal.

Accordingly, if zero crossing detector circuit 54 has not detected zero crossing at a moment when a fixed period arrives in the off period of switching element 42, on signal generator circuit 53 generates an on signal at least after zero crossing is detected. Thus, switching element 42 is prevented from being turned on before zero crossing is detected, or in other words, DC-to-DC converter 40 is prevented from operating in the continuous current mode (CCM). As a result, even if a power supply voltage to be input from AC power supply 3 suddenly changes, switching element 42 is prevented from being broken due to a gradual increase in current which flows through switching element 42, and stable operation of lighting device 1f is secured.

Furthermore, in the present embodiment, on signal generator circuit 53 performs the following control if zero crossing detector circuit 54 has not detected that a current has reached zero in the off period of switching element 42 at a moment when a periodic signal indicates arrival of a fixed period. In other words, on signal generator circuit 53 generates an on signal at least after zero crossing detector circuit 54 detects that a current has reached zero and at a moment when a periodic signal indicates arrival of a fixed period.

Accordingly, if zero crossing detector circuit 54 has not detected zero crossing at a moment when a fixed period arrives in the off period of switching element 42, a periodic signal is skipped, and on signal generator circuit 53 generates an on signal at least after zero crossing detector circuit 54 detects zero crossing. Thus, DC-to-DC converter 40 is reliably prevented from operating in the continuous current mode, and stable operation of lighting device 1f is secured.

Figure 24:
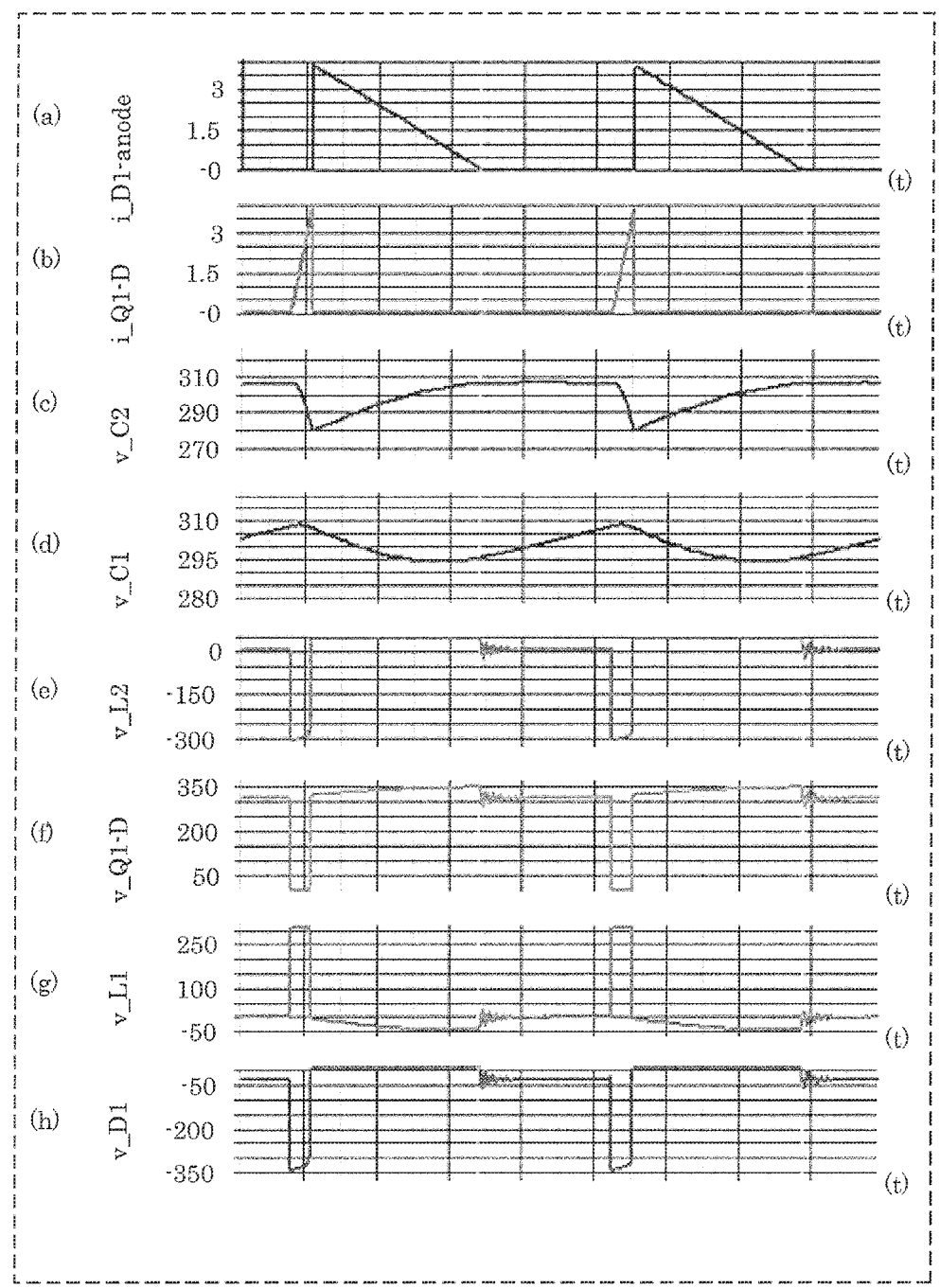
FIG. 24 illustrates waveforms of currents and voltages at various portions of a circuit of the lighting device according to Embodiment 5.

Note that in the present embodiment, zero crossing detector circuit 54 detects that a current which flows through diode 45 has reached zero (zero crossing) in the off period of switching element 42, by detecting a voltage across inductor 44, nevertheless the present embodiment is not limited to this. In lighting device 1f, a voltage or a current may be detected at a different portion where zero crossing can be detected. FIG. 24 illustrates waveforms of voltages and currents at various portions of a circuit of lighting device 1f according to the present embodiment. Here, FIG. 24 illustrates current i_D1-anode which flows through diode 45 ((a) in FIG. 24), current i_Q1-D which flows through switching element 42 ((b) in FIG. 24), voltage v_C2 across capacitor 43 ((c) in FIG. 24), voltage v_C1 across capacitor 32 ((d) in FIG. 24), voltage v_L2 across inductor 44 ((e) in FIG. 24), voltage v_Q1-D across the source and the drain of switching element 42 ((f) in FIG. 24), voltage v_L1 across inductor 41 ((g) in FIG. 24), and voltage v_D1 (reverse bias) across diode 45 ((h) in FIG. 24).

As is clear from FIG. 24, a current and voltages illustrated in (a) and (e) to (h) in FIG. 24 have waveforms showing zero crossing timings, and thus can be used to detect zero crossing. Note that a current sensor needs to be inserted in a target portion in series to detect a current, but may lead to an increase in power consumption. Accordingly, zero crossing may be detected by detecting a voltage, from the viewpoint of power consumption. Furthermore, in order to detect a voltage across inductor 41 or 44, a secondary winding may be added to the inductor, and a voltage which is generated in the secondary winding may be detected.

Variation 1 of Embodiment 5

In Embodiment 5 described above, on signal generator circuit 53 skips a periodic signal when a power supply voltage suddenly changes, and generates an on signal after zero crossing is detected. Yet, a method for delaying generation of an on signal is not limited to this. For example, on signal generator circuit 53 may delay generation of an on signal until zero crossing detector circuit 54 detects zero crossing, and output an on signal at a moment when zero crossing is detected, and periodic signal generator circuit 51 may be caused to generate a periodic signal whose starting point is the moment.

Figure 25:
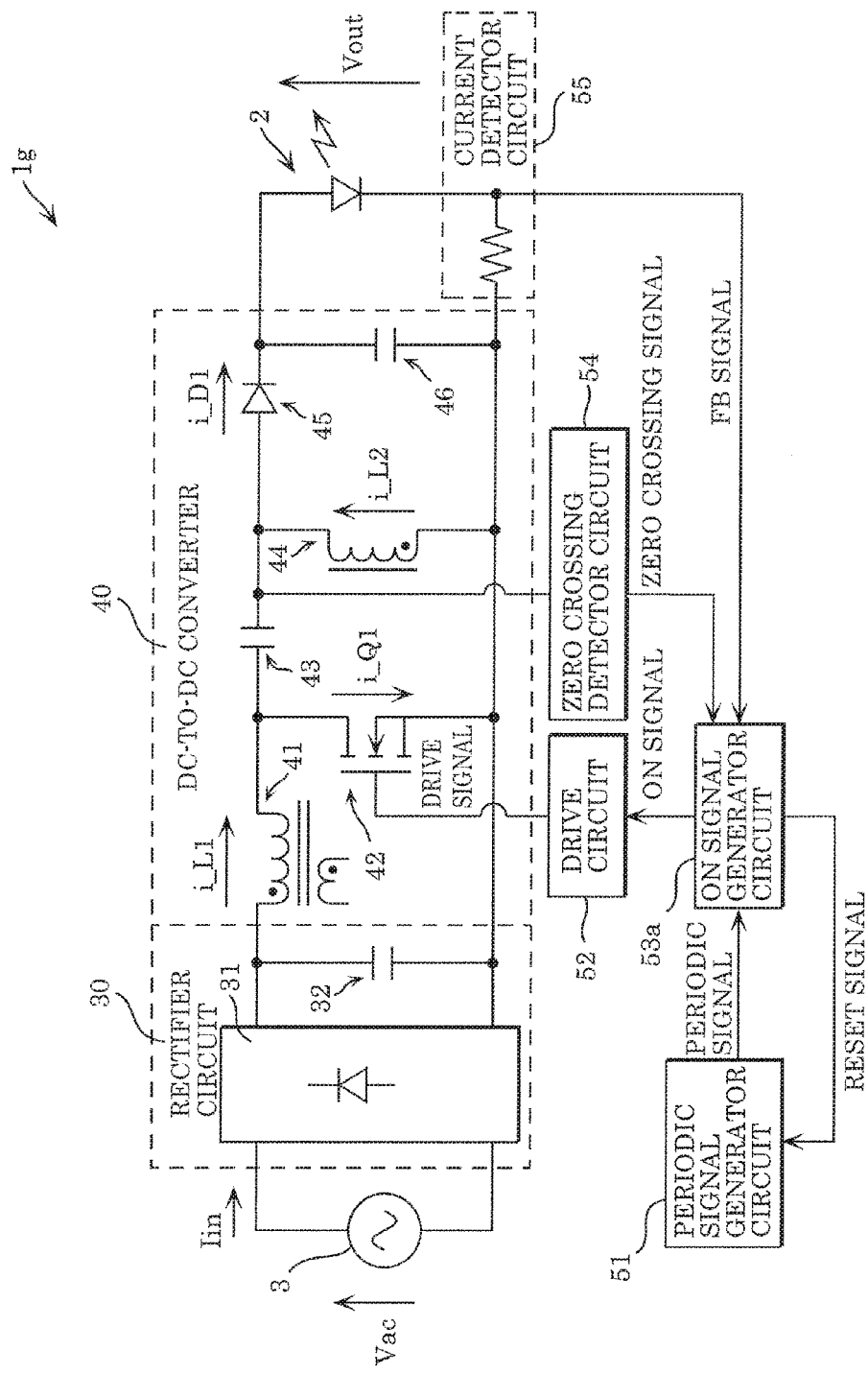
FIG. 25 is a circuit diagram illustrating a lighting device according to Variation 1 of Embodiment 5.

FIG. 25 is a circuit diagram of lighting device 1g according to Variation 1 of Embodiment 5 described above, which outputs an on signal at a moment when zero crossing is detected and causes periodic signal generator circuit 51 to generate a periodic signal whose starting point is the moment, as described above. In FIG. 25, the same elements are given the same reference symbols as the reference symbols in Embodiment 5 described above, and a description thereof is omitted. Lighting device 1g according to Variation 1 differs from lighting device 1f according to Embodiment 5 described above in the function of on signal generator circuit 53a and in that on signal generator circuit 53a outputs a reset signal to periodic signal generator circuit 51.

On signal generator circuit 53a performs the following control during the off period of switching element 42. In other words, if zero crossing detector circuit 54 has not detected that current has reached zero at a moment when a periodic signal indicates arrival of a fixed period, on signal generator circuit 53a outputs an on signal and sends a reset signal to periodic signal generator circuit 51 at a moment when zero crossing is detected.

Periodic signal generator circuit 51 which has received the reset signal generates a periodic signal whose starting point is the time when the reset signal is received, in each fixed period Tper.

Figure 26:
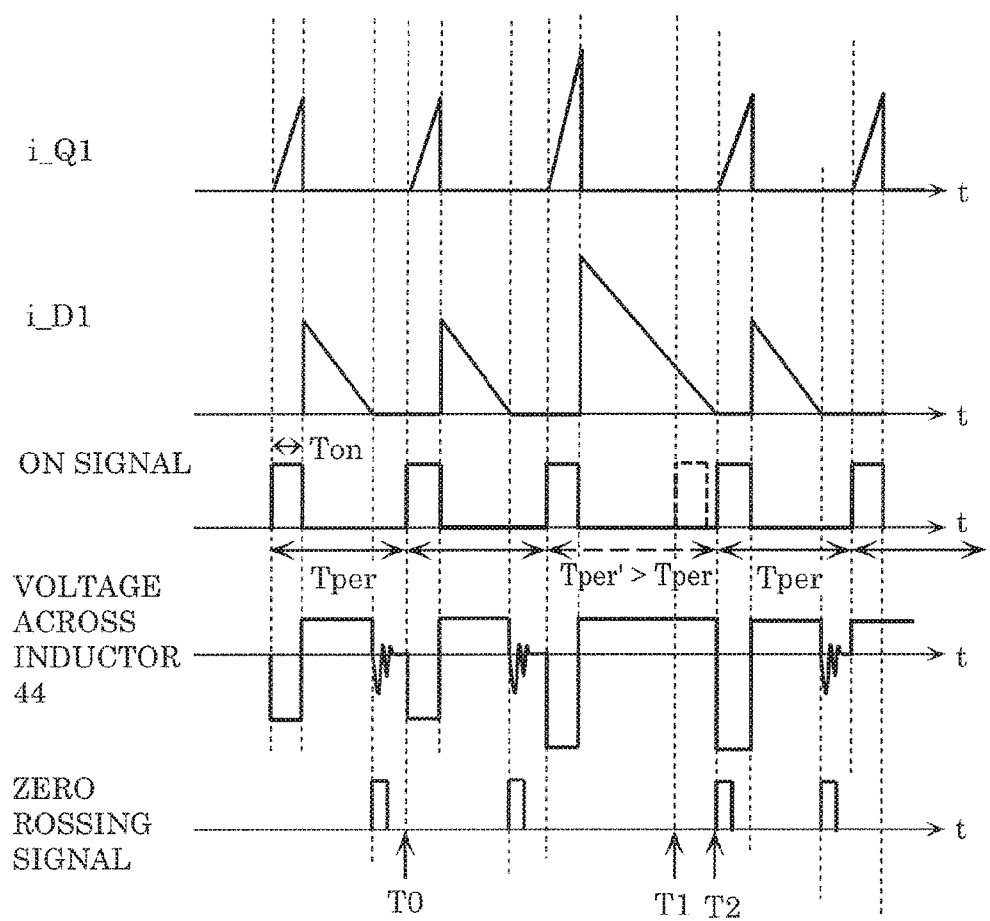
FIG. 26 is a timing diagram illustrating operation of the lighting device according to Variation 1 of Embodiment 5.

FIG. 26 is a timing diagram illustrating operation of lighting device 1g according to Variation 1. Here, FIG. 26 illustrates waveforms of current i_Q1 which flows through switching element 42, current i_D1 which flows through diode 45, an on signal, a voltage across inductor 44, and a zero crossing signal, as with FIG. 23 in Embodiment 5 described above. As is clear from a comparison between FIGS. 26 and 23, an on signal is not generated (time T1) if a zero crossing is not detected at a moment when a periodic signal indicates arrival of a fixed period when a power supply voltage is stable and when a power supply voltage suddenly changes, which is the same as the above embodiments.

However, in Variation 1, when zero crossing is detected (time T2), an on signal is output and thereafter, an on signal is generated in each fixed period Tper. This is because on signal generator circuit 53a performs the following control during the off period of switching element 42. In other words, if zero crossing is not detected at a moment when a periodic signal indicates arrival of a fixed period, generation of an on signal is delayed until zero crossing is detected, and an on signal is output and periodic signal generator circuit 51 is reset at a moment when zero crossing is detected.

Note that the example illustrated in FIG. 26 shows that a sudden change in the power supply voltage ceases within one period Tper. Furthermore, on signal generator circuit 53a may first send a reset signal to periodic signal generator circuit 51 at time T2 before generating an on signal, and generate an on signal in accordance with a periodic signal sent from periodic signal generator circuit 51.

Accordingly, on signal generator circuit 53a in lighting device 1g of Variation 1 performs the following distinctive control during the off period of switching element 42. In other words, if zero crossing detector circuit 54 has not detected that a current has reached zero at a moment when a periodic signal indicates arrival of a fixed period, on signal generator circuit 53a outputs an on signal and resets periodic signal generator circuit 51, at a moment when zero crossing is detected.

Accordingly, if zero crossing is not detected at a moment when a fixed period arrives in the off period of switching element 42, an on signal is generated at least after zero crossing is detected by delaying generation of an on signal until zero crossing is detected. Thus, DC-to-DC converter 40 is reliably prevented from operating in the continuous current mode, and stable operation of lighting device 1g is secured.

Variation 2 of Embodiment 5

A method of delaying an on signal for when a power supply voltage suddenly changes is not limited to the methods according to Embodiment 5 and Variation 1 described above. Generation of an on signal may be delayed such that an average of a current which flows through solid-state light emitting element 2 in each of the on-off periods (switching periods) of switching element 42 does not vary from a value in the past.

A lighting device according to Variation 2 of Embodiment 5 described above which fulfills such a function has the same configuration as the configuration of lighting device 1g according to Variation 1 described above and illustrated in FIG. 25. Note that in Variation 2, on signal generator circuit 53a performs the following control if zero crossing detector circuit 54 has not detected that current reaches zero at a moment when a periodic signal indicates arrival of a fixed period during the off period of switching element 42. In other words, on signal generator circuit 53a extends the off period of switching element 42 such that an average of a current which flows through solid-state light emitting element 2 during a switching period that includes the moment is substantially the same as a value in at least one period in the past, and thereafter generates an on signal. At this time, on signal generator circuit 53a sends a reset signal to periodic signal generator circuit 51 simultaneously with the output of an on signal.

Periodic signal generator circuit 51 which has received the reset signal generates a periodic signal whose starting point is a moment when the reset signal is received for each fixed period Tper, as with Variation 1 described above.

Figure 27:
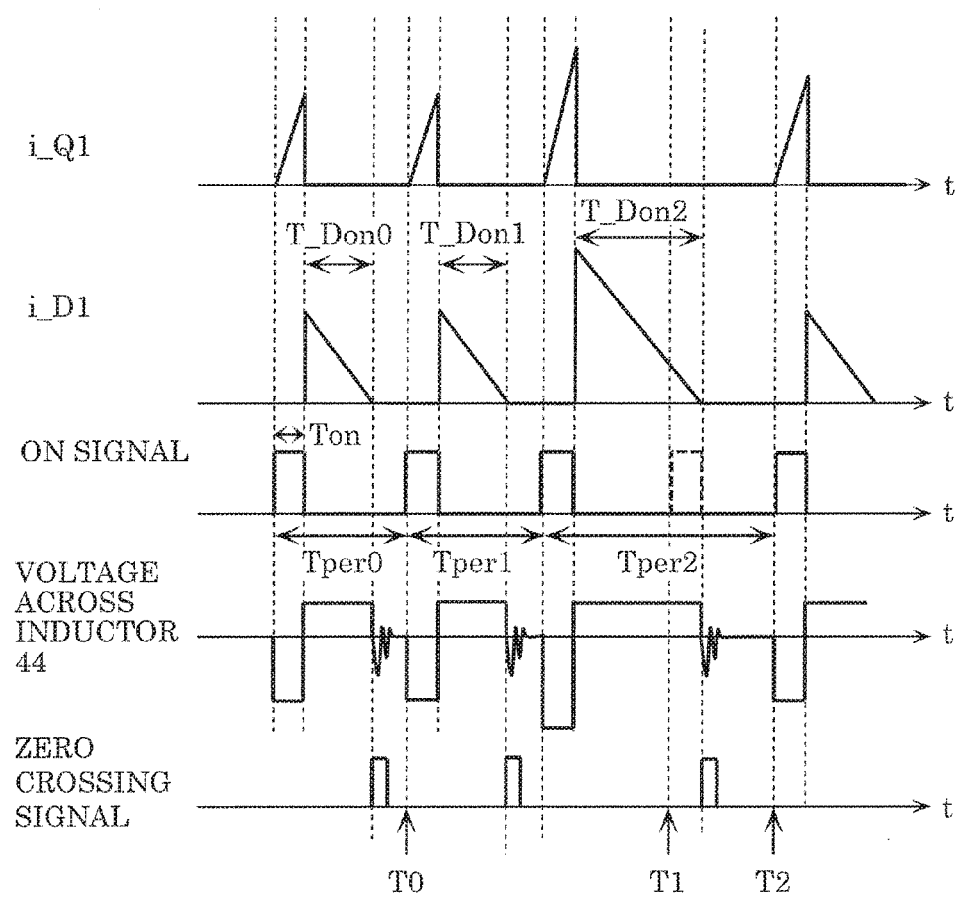
FIG. 27 is a timing diagram illustrating operation of a lighting device according to Variation 2 of Embodiment 5.

FIG. 27 is a timing diagram illustrating operation of the lighting device according to Variation 2. Here, FIG. 27 illustrates waveforms of current i_Q1 which flows through switching element 42, current i_D1 which flows through diode 45, an on signal, a voltage across inductor 44, and a zero crossing signal, as with FIG. 23 in Embodiment 5 described above. As is clear from a comparison between FIG. 27 and FIGS. 23 and 26, if zero crossing is not detected at a moment when a periodic signal indicates arrival of a fixed period, when a power supply voltage suddenly changes, on signal generator circuit 53a does not generate an on signal (time T1), as with Embodiment 5 and Variation 1 described above.

In Variation 2, however, on signal generator circuit 53a generates an on signal at a time (time T2) when an average of a current which flows through solid-state light emitting element 2 in each switching period when a power supply voltage is stable is the same as an average of a current which flows through solid-state light emitting element 2 in each switching period when a power supply voltage suddenly changes. Specifically, on signal generator circuit 53a calculates delay time Tper2 in accordance with Expression 9 below, if zero crossing is not detected at a moment when a periodic signal from periodic signal generator circuit 51 indicates arrival of a fixed period (Tper1).

$$T\text{per}2 = (T\_Don2)^2/(T\_Don1)^2 \times T\text{per}1 \quad \text{(Expression 9)}$$

Here, T_Don2 is a time period when a current is flowing through diode 45 if zero crossing is not detected at a moment when a periodic signal from periodic signal generator circuit 51 indicates arrival of a fixed period (Tper1). In other words, T_Don2 is a time period from when the output of a previous on signal ends (i.e., the previous on signal becomes low) until when zero crossing is detected, when a power supply voltage suddenly changes. T_Don1 is a time period when a current is flowing through diode 45 in a period (when a power supply voltage is stable) immediately before when a power supply voltage suddenly changes.

Then, on signal generator circuit 53a generates an on signal at a time (time T2) after currently calculated delay time Tper2 has elapsed since an on signal is generated immediately before a power supply voltage suddenly changes.

Here, Expression 9 shown above is derived from Expression 10 below.

$$(T\_Don1)^2/T\text{per}1 = (T\_Don2)^2/T\text{per}2 \quad \text{(Expression 10)}$$

Figure 28:
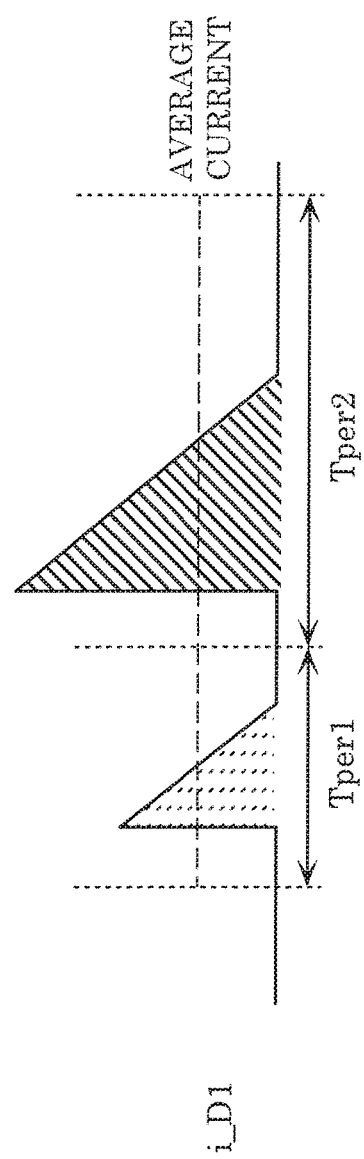
FIG. 28 illustrates a waveform of a current which flows through a diode in Variation 2 of Embodiment 5.

Here, a voltage across solid-state light emitting element 2 is substantially the same during T_Don1 and T_Don2, and thus T_Don1 and T_Don2 are proportional to peak values of a current which flows through diode 45. Thus, Expression 10 given above shows that an average of a current (average current) which flows through diode 45 during period Tper1 and an average of a current (average current) which flows through diode 45 during period Tper2 are the same, as illustrated in FIG. 28. This shows that the above control by on signal generator circuit 53a achieves substantially the same averages of a current which flows through diode 45 (i.e., a current which flows through solid-state light emitting element 2) for when a power supply voltage is stable (periodic Tper1) and when a power supply voltage suddenly changes (periodic Tper2).

As described above, according to Variation 2, if zero crossing is not detected at a moment when a fixed period arrives in the off period of switching element 42, generation of an on signal is delayed so that an average of a current which flows through solid-state light emitting element 2 is fixed. Accordingly, a constant current mode is maintained, and furthermore DC-to-DC converter 40 is reliably prevented from operating in the continuous current mode. Thus, stable operation of lighting device 1f is secured. Furthermore, according to Variation 2, an average of a current which flows through solid-state light emitting element 2 is fixed in each period, and thus a change in optical output from solid-state light emitting element 2 when a power supply voltage suddenly changes is inhibited.

Note that in the above example of control, on signal generator circuit 53a uses time T_Don1 during which a current has been flowing through diode 45 in a previous period (Tper1) when a power supply voltage suddenly changes, yet on signal generator circuit 53a may use such a time in two or more periods. For example, delay time Tper2 described above may be calculated using times T_Don0 and T_Don1 during which a current has been flowing through diode 45 in periods Tper0 and Tper1 in FIG. 27.

Embodiment 6

Figure 29:
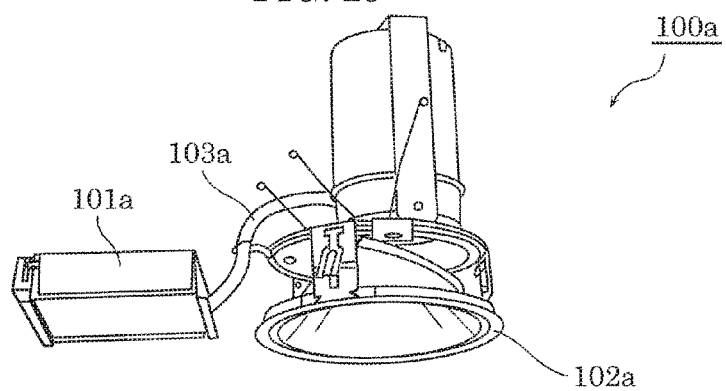
FIG. 29 is an external view of an illumination apparatus according to Embodiment 6.
Figure 30:
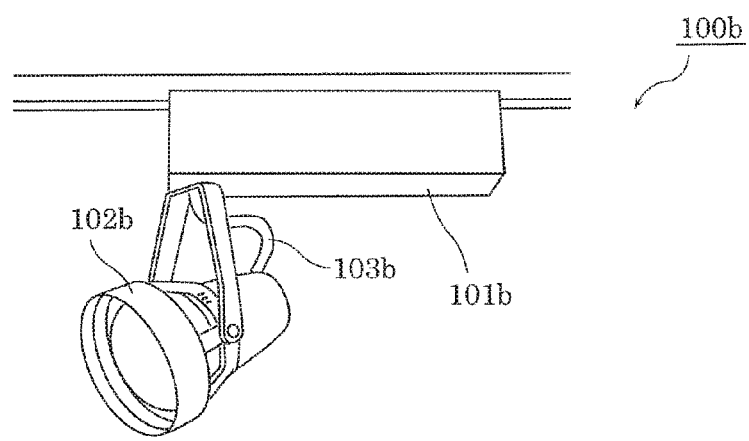
FIG. 30 is an external view of an illumination apparatus according to Embodiment 6.
Figure 31:
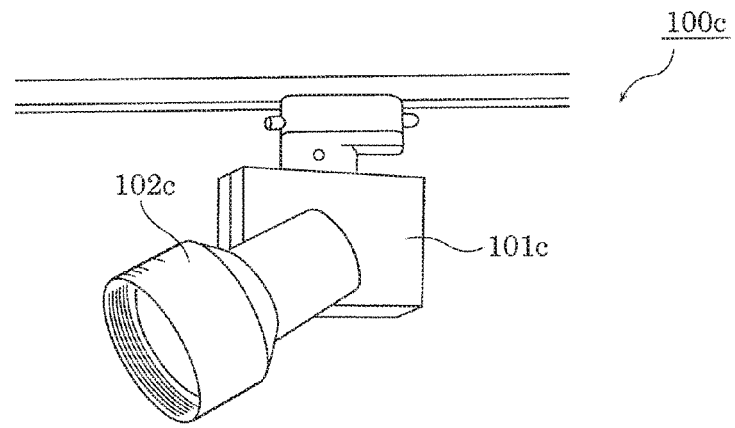
FIG. 31 is an external view of an illumination apparatus according to Embodiment 6.

Next, Embodiment 6 describes illumination apparatuses which include the lighting devices according the above embodiments, with reference to FIGS. 29 to 31.

FIGS. 29 to 31 illustrate external views of illumination apparatuses according to the present embodiment. Here, examples of such an illumination apparatus include downlight 100a (FIG. 29), and spotlights 100b (FIG. 30) and 100c (FIG. 31). Downlight 100a and spotlights 100b and 100c include circuit boxes 101a, 101b, and 101c, respectively. Circuit boxes 101a, 101b, and 101c are casings in each of which at least one circuit of the lighting devices according to the above embodiments is contained. Downlight 100a and spotlights 100b and 100c include lights 102a, 102b, and 102c, respectively. Lights 102a, 102b, and 102c each include LED 2. Downlight 100a and spotlight 100b include lines 103a and 103b, respectively, which electrically connect circuit boxes 101a and 101b to LED 2 of each of lights 102a and 102b.

The present embodiment also achieves equivalent effects as those of the above embodiments.

Variations and Others

The above has described the lighting devices according to the present disclosure based on the above embodiments, yet the present disclosure is not limited to these embodiments.

For example, although the circuit diagrams illustrate one LED 2, yet the number of LEDs 2 is not limited to one. For example, a configuration in which a plurality of LED chips are connected in series parallel, a configuration in which a plurality of LED elements are modularized, or a configuration in which a plurality of modules are combined may be used.

Furthermore, although an LED is used as a solid-state light emitting element in the above embodiments, the solid-state light emitting element which is a load of the lighting device is not limited to an LED. For example, another solid-state light emitting element, such as an organic EL element, may be used as a load of the lighting device.

A feedback circuit may include an integrated circuit (IC). Furthermore, a feedback circuit may have a configuration of digital control using a microcomputer, for instance.

Furthermore, in the above embodiments, the current detector directly detects a current which flows through switching element 16, yet may indirectly detect a current which flows through switching element 16 by detecting a current which flows through another element.

Furthermore, in Embodiment 1 described above, overcurrent preventer circuit 111 is included on the input side of drive circuit 112, yet may be included on the output side.

In the above embodiments, current detector 12 and output detector 13 detect a current or a voltage using a resistor, yet may use, for instance, an element other than a resistor to detect a current or a voltage.

Furthermore, inductor 18 used in the above embodiments may have a transformer structure which includes a primary winding and a secondary winding. If inductor 18 has a transformer structure, the windings of inductor 18 are connected to other elements as follows. Specifically, in the lighting devices according to the above embodiments, one terminal of the primary winding is connected to an output terminal of capacitor 17, and the other terminal of the primary winding is grounded. Furthermore, one terminal of the secondary winding is connected to the anode electrode of diode 19, and the other terminal of the secondary winding is grounded. Furthermore, capacitor 17 and diode 19 are insulated by inductor 18 which has a transformer structure. In this case, the output detector of the lighting devices may detect output currents from the lighting devices as outputs, or a sense resistor may be connected on the primary winding side, and the output detector may detect a current which flows through the primary winding as an output.

For example, although on signal generator circuits 53 and 53a each include, for instance, a processor and a program in Embodiment 5 and the variations above, the configurations of on signal generator circuits 53 and 53a are not limited to such a configuration, and may have logical circuits such as an AND circuit, and an analog circuit such as an A/D converter, for example.

In Embodiment 5 and the variations above, although lighting devices 1f and 1g each include a SEPIC DC-to-DC converter, the type of the DC-to-DC converter is not limited to this. Lighting devices 1f and 1g may each include a DC-to-DC converter which turns on a switching element in each fixed period. So long as a lighting device includes the distinctive on signal generator circuit according to the present disclosure, the DC-to-DC converter is prevented from operating in the continuous current mode (CCM) even if a power supply voltage suddenly changes.

The scope of the present disclosure may also include embodiments as a result of adding various modifications to the embodiments that may be conceived by those skilled in the art, and embodiments obtained by combining elements and functions in the embodiments in any manner as long as the combinations do not depart from the spirit of the present disclosure.

For example, a combination of Embodiments 1 and 2 described above achieves improved advantageous effect of preventing an excessive current since switching element 16 can be turned off immediately, and the subsequent on time can also be shortened when current ISW exceeds threshold Ith.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device which outputs a current to a solid-state light emitting element, the lighting device comprising:
   a direct current-to-direct current (DC-to-DC) converter; and
   an output detector which detects an output from the DC-to-DC converter, wherein
   the DC-to-DC converter includes:
      a switching element;
      a control device which turns on and off the switching element in order to generate the output; and
      a current detector which detects a current which flows through the switching element, and
   if a current value of the current detected by the current detector is less than a predetermined threshold, the control device controls the switching element at a fixed frequency and according to a fixed duty cycle and at a moment when the current value exceeds the predetermined threshold, the control device turns off the switching element.

2. The lighting device according to claim 1, wherein the DC-to-DC converter increases or decreases an input voltage, based on characteristics of the solid-state light emitting element, and outputs the input voltage increased or decreased.

3. The lighting device according to claim 1, wherein the DC-to-DC converter is a single ended primary inductance converter (SEPIC).

4. The lighting device according to claim 1, wherein the predetermined threshold is less than or equal to an absolute maximum current rating of the switching element.

5. The lighting device according to claim 1, wherein the predetermined threshold is greater than or equal to a current value of a current which flows through the switching element when a rated voltage of the lighting device is steadily input to the lighting device.

6. The lighting device according to claim 1, wherein the control device includes:
   a drive circuit which drives the switching element; and
   a transistor connected to the drive circuit, and
   if the current value is greater than the predetermined threshold, the control device turns off the switching element by turning on the transistor.

7. The lighting device according to claim 1, wherein if the current value is greater than the predetermined threshold, the control device keeps the switching element off throughout a switching period of the switching element.

8. An illumination apparatus comprising:
   the lighting device according to claim 1; and
   the solid-state light emitting element which receives supply of the current from the lighting device.

* * * * *

UNITED STATES PATENT AND TRADEMARK OFFICE
CERTIFICATE OF CORRECTION

PATENT NO. : 9,706,615 B2  
APPLICATION NO. : 15/134759  
DATED : July 11, 2017  
INVENTOR(S) : Seki et al.

Page 1 of 1

It is certified that error appears in the above-identified patent and that said Letters Patent is hereby corrected as shown below:

On the Title Page

Assignee, "Panasonic Intettectual Property Management Co., Ltd." should read --Panasonic Intellectual Property Management Co., Ltd.--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*